(12) United States Patent
Kim et al.

(10) Patent No.: US 11,902,928 B2
(45) Date of Patent: Feb. 13, 2024

(54) METHOD FOR LOCATING TERMINAL IN WIRELESS COMMUNICATION SYSTEM AND DEVICE THEREFOR

(71) Applicant: LG ELECTRONICS INC., Seoul (KR)

(72) Inventors: Youngsub Kim, Seoul (KR); Kijun Kim, Seoul (KR); Hyunsu Cha, Seoul (KR); Hyunsoo Ko, Seoul (KR); Sukhyon Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 257 days.

(21) Appl. No.: 17/274,747

(22) PCT Filed: Sep. 16, 2019

(86) PCT No.: PCT/KR2019/011919
§ 371 (c)(1),
(2) Date: Mar. 9, 2021

(87) PCT Pub. No.: WO2020/060199
PCT Pub. Date: Mar. 26, 2020

(65) Prior Publication Data
US 2022/0053443 A1    Feb. 17, 2022

(30) Foreign Application Priority Data
Sep. 21, 2018  (KR) .................. 10-2018-0114204
Jan. 31, 2019  (KR) .................. 10-2019-0012522

(51) Int. Cl.
*H04W 24/10*    (2009.01)
*H04W 56/00*    (2009.01)
(Continued)

(52) U.S. Cl.
CPC ....... *H04W 56/0055* (2013.01); *G01S 5/0244* (2020.05); *H04L 5/0051* (2013.01);
(Continued)

(58) Field of Classification Search
CPC . H04W 24/10; H04W 56/00; H04W 56/0055; H04W 64/00; H04W 76/10
(Continued)

(56) References Cited

U.S. PATENT DOCUMENTS 9,258,718 B2 *  2/2016  Ji .................. H04W 72/0446
10,244,479 B1 *  3/2019  Backholm ......... H04W 52/0264
(Continued)

FOREIGN PATENT DOCUMENTS

KR    20180018237        2/2018
WO    WO-2015139184 A1 *  9/2015  ........... G01S 5/0036
(Continued)

OTHER PUBLICATIONS

PCT International Application No. PCT/KR2019/011919, International Search Report dated Dec. 20, 2019, 16 pages.
(Continued)

*Primary Examiner* — Joseph Arevalo
(74) *Attorney, Agent, or Firm* — LEE, HONG, DEGERMAN, KANG & WAIMEY

(57) ABSTRACT

Disclosed according to the present invention is a method for reporting a reference signal timing difference (RSTD) value by a terminal, in a wireless communication system. Specifically, the method may comprise: transmitting a random access preamble related to a synchronization signal/physical broadcast channel block (SS/PBCH block) received from a particular cell among multiple cells; requesting a radio resource control (RRC) connection to the particular cell on the basis of a random access response (RAR) received from the particular cell, to make establishment of the RRC
(Continued)

connection to the particular cell; receiving, from a location server, a cell group identifier for a cell group including the multiple cells and independent cell information for each of the multiple cells; detecting second PRS sequences transmitted from the respective multiple cells on the basis of a first PRS sequence related to the cell group identifier; and reporting, to the location server, at least one piece of reference signal timing difference (RSTD) information acquired on the basis of the second PRS sequences and the independent cell information.

14 Claims, 24 Drawing Sheets

(51) Int. Cl.
- *H04L 5/00* (2006.01)
- *H04W 64/00* (2009.01)
- *G01S 5/02* (2010.01)
- *H04W 76/10* (2018.01)

(52) U.S. Cl.
CPC ........... *H04W 24/10* (2013.01); *H04W 64/00* (2013.01); *H04W 76/10* (2018.02)

(58) Field of Classification Search
USPC ........... 455/456.1, 67.11, 41.3, 456.3, 452.1, 455/456.2, 418, 522, 450, 574
See application file for complete search history.

(56) References Cited

U.S. PATENT DOCUMENTS

| | | | |
|---|---|---|---|
| 11,095,483 B2* | 8/2021 | Zhang | H04W 72/23 |
| 11,290,998 B2* | 3/2022 | Pan | H04W 74/0833 |
| 2010/0317351 A1* | 12/2010 | Gerstenberger | H04W 8/26 455/443 |
| 2016/0373588 A1* | 12/2016 | Raleigh | H04L 12/1407 |
| 2017/0070312 A1 | 3/2017 | Yi et al. | |
| 2017/0243485 A1* | 8/2017 | Rubin | H04W 4/46 |
| 2019/0208366 A1* | 7/2019 | Sosnin | G01S 13/876 |
| 2019/0236510 A1* | 8/2019 | Kwak | G07C 5/0841 |
| 2019/0236863 A1* | 8/2019 | Kwak | G07C 5/0808 |
| 2019/0260879 A1* | 8/2019 | Raleigh | H04M 15/83 |

FOREIGN PATENT DOCUMENTS

| | | | |
|---|---|---|---|
| WO | WO-2016162779 A1 * | 10/2016 | ............... G01S 1/68 |
| WO | 2018025794 | 2/2018 | |

OTHER PUBLICATIONS

Qualcomm Incorporated, "RSTD measurement accuracy of colliding NPRS," 3GPP TSG-RAN WG4 Meeting #86bis, R4-1804255, Apr. 2018, 7 pages.

Ericsson, "On NPRS performance," 3GPP TSG-RAN WG1#93, R1-1806909, May 2018, 7 pages.

* cited by examiner (A) CONTROL-PLANE PROTOCOL STACK (B) USER-PLANE PROTOCOL STACK

METHOD FOR LOCATING TERMINAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2019/011919, filed on Sep. 16, 2019, which claims the benefit of earlier filing date and right of priority to Korean Application Nos. 10-2018-0114204, filed on Sep. 21, 2018 and 10-2019-0012522, filed on Jan. 31, 2019, the contents of which are all hereby incorporated by reference herein their entirety.

TECHNICAL FIELD

The present invention relates to a method of measuring a location of a user equipment and apparatus therefor, and more particularly, to a method of measuring a location of a user equipment and apparatus therefor by detecting Positioning Reference Signals (PRSs) transmitted through a plurality of base stations/TPs based on a single Positioning Reference Signal (PRS).

BACKGROUND ART

As more communication devices require greater communication traffic, necessity for a mobile broadband communication, which is enhanced compared to a legacy radio access technology (RAT), is emerging. Massive MTC (machine type communication) providing a user with various services anywhere and at any time by connecting many devices and objects is one of important issues to be considered in the next generation communication system. Moreover, discussion on designing a communication system in consideration of a service sensitive to reliability and latency is in progress. In particular, discussion on the introduction of a next generation RAT considering eMBB (enhanced mobile broadband communication), massive MTC (mMTC), URLLC (ultra-reliable and low latency communication), and the like is in progress. In the present invention, for clarity, the next generation RAT is referred to as a New RAT.

DETAILED DESCRIPTION OF DISCLOSURE

Technical Task

The present disclosure intends to provide a method of measuring a location of a User Equipment (UE) in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In one technical aspect of the present disclosure, provided is a method of reporting a Reference Signal Timing Difference (RSTD) value by a user equipment in a wireless communication system, the method including transmitting a random access preamble related to a Synchronization Signal/Physical Broadcast Channel Block (SS/PBCH) block received from a specific cell included in a plurality of cells, establishing an RRC connection to the specific cell by requesting a Radio Resource Control (RRC) connection based on a Random Access Response (RAR) received from the specific cell, receiving a cell group identifier for a cell group including a plurality of the cells and cell-independent informations for a plurality of the cells each from a location server, detecting second PRS sequences transmitted from a plurality of the cells respectively based on a first PRS sequence related to the cell group identifier, and reporting at least one Reference Signal Timing Difference (RSTD) information established based on the second PRS sequences and the cell-independent informations to the location server.

The cell-independent information may include cyclic shift values for a plurality of the cells each, actual time shift values for a plurality of the cells each, or Discrete Fourier Transform (DFT) sequences for a plurality of the cells each.

The first PRS sequence may be obtained based on the cell group identifier and the cell-independent information for a reference cell.

The method may further include receiving expected RSTD information, expected RSTD uncertainty information, expected RSTD compensation information and expected RSTD uncertainty compensation information from the location server and obtaining at least one PRS search window for a plurality of the cells based on the expected RSTD information, the expected RSTD uncertainty information, the expected RSTD compensation information and the expected RSTD uncertainty compensation information.

The second PRS sequences may be detected within the at least one PRS search window.

The expected RSTD information and the expected RSTD uncertainty information may be included in cell group common information and the expected RSTD compensation information and the expected RSTD uncertainty compensation information may be included in the cell-independent informations.

The at least one PRS search window may not overlap with each other.

The second PRS sequence related to a narrow bandwidth may be configured as a portion of the second PRS sequence related to a wide bandwidth.

The second PRS sequence related to a wide bandwidth may be configured in a manner that the second PRS sequence related to a narrow bandwidth is repeated.

The user equipment may communicate with at least one of another user equipment, a network, a base station or an autonomous vehicle.

In another technical aspect of the present disclosure, provided is an apparatus for reporting a Reference Signal Timing Difference (RSTD) value in a wireless communication system, the apparatus including at least one processor and at least one memory operatively connected to the at least one processor and storing instructions to enable the at least one processor to perform a specific operation if executed, wherein the specific operation may include transmitting a random access preamble related to a Synchronization Signal/Physical Broadcast Channel Block (SS/PBCH) block received from a specific cell included in a plurality of cells, establishing an RRC connection to the specific cell by requesting a Radio Resource Control (RRC) connection based on a Random Access Response (RAR) received from the specific cell, receiving a cell group identifier for a cell group including a plurality of the cells and cell-independent informations for a plurality of the cells each from a location server, detecting second PRS sequences transmitted from a plurality of the cells respectively based on a first PRS sequence related to the cell group identifier, and reporting at least one Reference Signal Timing Difference (RSTD) information established based on the second PRS sequences and the cell-independent informations to the location server.

In another technical aspect of the present disclosure, provided is a user equipment configured to report a Reference Signal Timing Difference (RSTD) value in a wireless communication system, the user equipment including at least one transceiver, at least one processor, and at least one memory operatively connected to the at least one processor and storing instructions to enable the at least one processor to perform a specific operation if executed, wherein the specific operation may include transmitting a random access preamble related to a Synchronization Signal/Physical Broadcast Channel Block (SS/PBCH) block received from a specific cell included in a plurality of cells, establishing an RRC connection to the specific cell by requesting a Radio Resource Control (RRC) connection based on a Random Access Response (RAR) received from the specific cell, receiving a cell group identifier for a cell group including a plurality of the cells and cell-independent informations for a plurality of the cells each from a location server, detecting second PRS sequences transmitted from a plurality of the cells respectively based on a first PRS sequence related to the cell group identifier, and reporting at least one Reference Signal Timing Difference (RSTD) information established based on the second PRS sequences and the cell-independent informations to the location server.

In another technical aspect of the present disclosure, provided is a method of transmitting a Positioning Reference Signal (PRS) by a base station in a wireless communication system, the method including receiving a random access preamble related to a Synchronization Signal/Physical Broadcast Channel Block (SS/PBCH) block transmitted by the base station, transmitting a Random Access Response (RAR) in response to the random access preamble, performing a Radio Resource Control (RRC) connection to a user equipment based on the RAR, obtaining an initialization value for a PRS sequence based on a cell group identifier for a cell group having the base station included therein, generating the PRS sequence based on the initialization value and cell-independent information for the base station, and transmitting the PRS sequence to the user equipment.

In further technical aspect of the present disclosure, provided is a base station configured to transmit a Positioning Reference Signal (PRS) in a wireless communication system, the base station including at least one transceiver, at least one processor, and at least one memory operatively connected to the at least one processor and storing instructions to enable the at least one processor to perform a specific operation if executed, wherein the specific operation may include receiving a random access preamble related to a Synchronization Signal/Physical Broadcast Channel Block (SS/PBCH) block transmitted by the base station, transmitting a Random Access Response (RAR) in response to the random access preamble, performing a Radio Resource Control (RRC) connection to a user equipment based on the RAR, obtaining an initialization value for a PRS sequence based on a cell group identifier for a cell group having the base station included therein, generating the PRS sequence based on the initialization value and cell-independent information for the base station, and transmitting the PRS sequence to the user equipment.

Advantageous Effects

According to the present disclosure, even in an environment that a multitude of cells are arranged together with small cells, a UE may raise accuracy of UE's positioning while receiving a Positioning Reference Signal (PRS) efficiently.

It will be appreciated by persons skilled in the art that the effects that could be achieved with the present disclosure are not limited to what has been particularly described hereinabove and other advantages of the present disclosure will be more clearly understood from the following detailed description.

BEST MODE FOR DISCLOSURE

Figure 1:
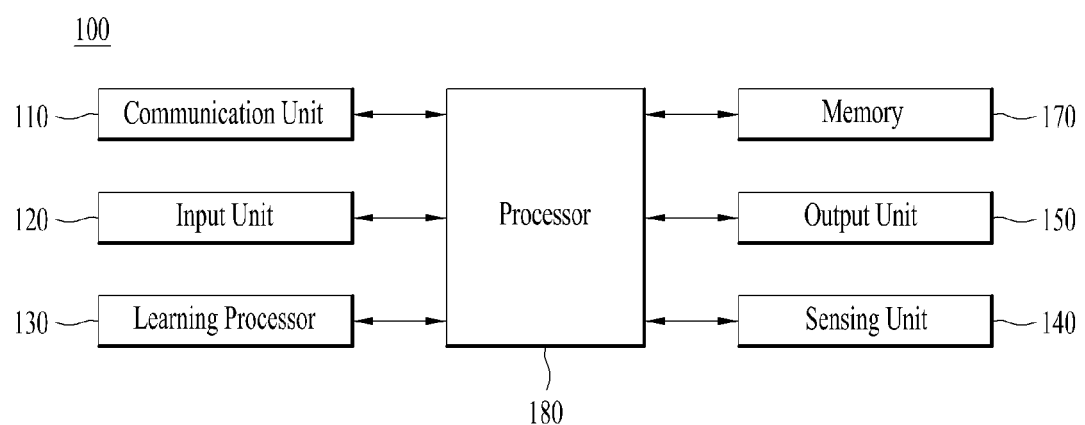
FIGS. 1 to 3 are diagrams illustrating an AI apparatus and AI system according to an embodiment of the present disclosure.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of Long Term Evolution (LTE) and LTE-Advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-Driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

FIG. 1 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech-to-text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 2:
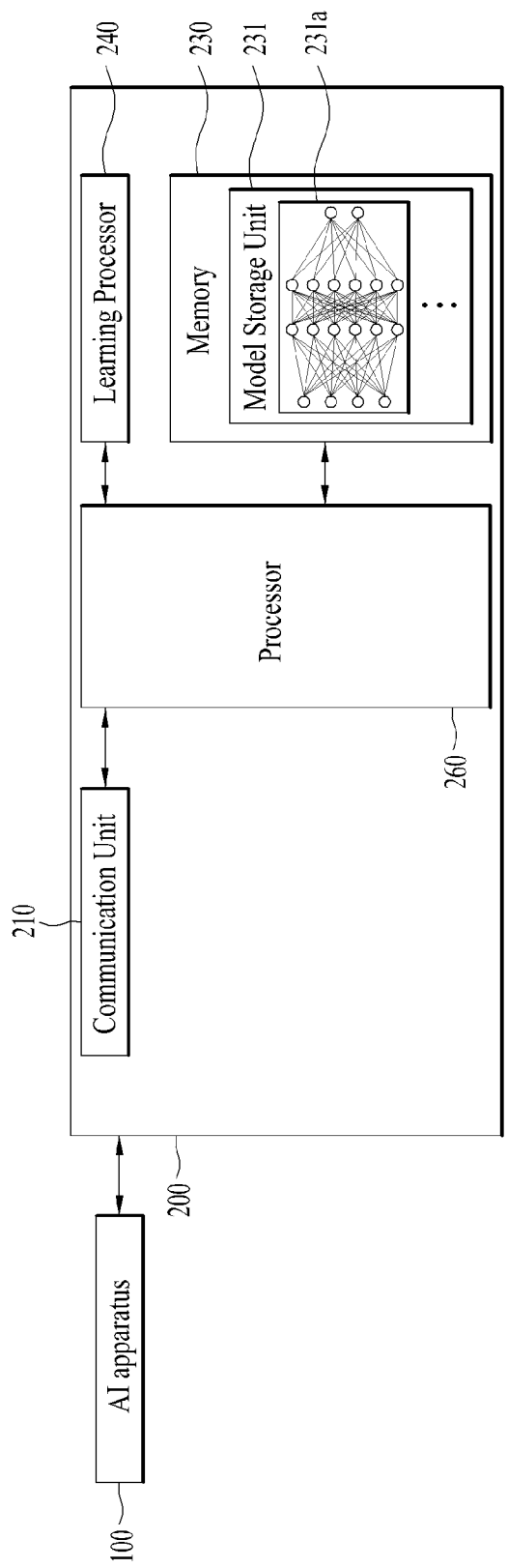

FIG. 2 illustrates the AI server 200 according to an embodiment of the present disclosure.

Referring to FIG. 2, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231*a*) through the learning processor 240.

The learning processor 240 may train the ANN 231*a* based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

Figure 3:
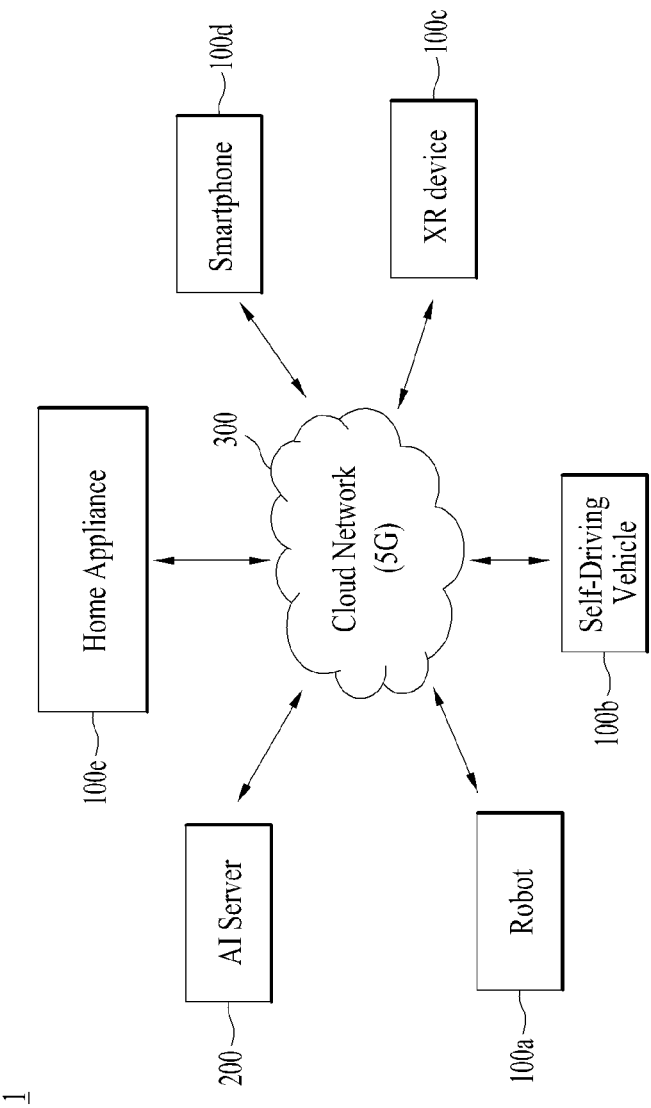

FIG. 3 illustrates an AI system 1 according to an embodiment of the present disclosure.

Referring to FIG. 3, at least one of the AI server 200, a robot 100*a*, an autonomous driving vehicle 100*b*, an XR device 100*c*, a smartphone 100*d*, and a home appliance 100*e* is connected to a cloud server 10 in the AI system 1. Here, the robot 100*a*, the autonomous vehicle 100*b*, the XR device 100*c*, the smartphone 100*d*, or the home appliance 100*e*, to which the AI technology is applied, may be referred to as an AI device 100*a* to 100*e*.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100*a* to 100*e* and 200 included in the AI system 1 may be connected to each other through the cloud network 10. In particular, the devices 100*a* to 100*e* and 200 may communicate with each other through a BS or may communicate with each other directly without the BS.

The AI server 200 may include a server in charge of AI processing and a server in charge of big data computation.

The AI server 200 may be connected to at least one of the robot 100*a*, the autonomous vehicle 100*b*, the XR device 100*c*, the smartphone 100*d*, or the home appliance 100*e* included in the AI system 1 via the cloud network 10 and help at least part of AI processing of the connected AI devices 100*a* to 100*e*.

In this case, the AI server 200 may train an ANN according to a machine learning algorithm on behalf of the AI devices 100*a* to 100*e* and directly store or transmit a learning model to the AI devices 100*a* to 100*e*.

The AI server 200 may receive input data from the AI devices 100*a* to 100*e*, infer a result value for the received input data based on the learning model, generate a response or control command based on the inferred result value, and transmit the response or control command to the AI devices 100*a* to 100*e*.

Alternatively, the AI devices 100*a* to 100*e* may directly infer the result value for the input data based on the learning model and generate the response or control command based on the inferred result value.

Hereinafter, various embodiments of the AI devices 100*a* to 100*e* to which the above-described technology is applied will be described. The AI devices 100*a* to 100*e* illustrated in FIG. 3 may be considered as a specific example of the AI device 100 illustrated in FIG. 1.

<AI+Robot>

If the AI technology is applied to the robot 100a, the robot 100a may be implemented as a guide robot, a transport robot, a cleaning robot, a wearable robot, an entertainment robot, a pet robot, an unmanned flying robot, etc.

The robot 100a may include a robot control module for controlling an operation, and the robot control module may refer to a software module or a chip implemented by hardware.

The robot 100a may obtain state information of the robot 100a, detect (recognize) a surrounding environment and objects, generate map data, determine a travel route or driving plan, or determine a response or action to user interaction by using sensor information obtained from various types of sensors.

To determine the travel route or driving plan, the robot 100a may use sensor information obtained from at least one of the following sensors: a LIDAR, a radar, and a camera to determine a movement route and a travel plan.

The robot 100a may perform the above-described operations based on a learning model configured with at least one ANN. For example, the robot 100a may recognize the surrounding environment and objects based on the learning model and determine an operation based on the recognized surrounding environment or object. Here, the learning model may be directly trained by the robot 100a or by an external device such as the AI server 200.

The robot 100a may operate by directly generating a result based on the learning model. Alternatively, the robot 100a may transmit sensor information to the external device such as the AI server 200 and receive a result generated based on the sensor information.

The robot 100a may determine the travel route and driving plan based on at least one of the map data, the object information detected from the sensor information, or the object information obtained from the external device. Then, the robot 100a may move according to the determined travel path and driving plan under control of its driving unit.

The map data may include object identification information about various objects placed in a space in which the robot 100a moves. For example, the map data may include object identification information about fixed objects such as walls and doors and movable objects such as flower pots and desks. The object identification information may include a name, a type, a distance, a position, etc.

The robot 100a may operate and move by controlling the driving unit based on the user control/interaction. In this case, the robot 100a may obtain intention information from the motion or speech of the user and determine a response based on the obtained intention information.

<AI+Autonomous Driving>

If the AI technology is applied to the autonomous driving vehicle 100b, the autonomous driving vehicle 100b may be implemented as a mobile robot, a vehicle, an unmanned flying vehicle, etc.

The autonomous driving vehicle 100b may include an autonomous driving control module for controlling the autonomous driving function, and the autonomous driving control module may refer to a software module or a chip implemented by hardware. The autonomous driving control module may be included in the autonomous driving vehicle 100b as a component thereof, but it may be implemented with separate hardware and connected to the outside of the autonomous driving vehicle 100b.

The autonomous driving vehicle 100b may obtain state information about the autonomous driving vehicle 100b based on sensor information acquired from various types of sensors, detect (recognize) a surrounding environment and objects, generate map data, determine a travel route and driving plan, or determine an operation.

Similarly to the robot 100a, the autonomous driving vehicle 100b may use the sensor information obtained from at least one of the following sensors: a LIDAR, a radar, and a camera so as to determine the travel route and driving plan.

In particular, the autonomous driving vehicle 100b may recognize an environment and objects in an area hidden from view or an area over a certain distance by receiving the sensor information from external devices. Alternatively, the autonomous driving vehicle 100b may receive information, which is recognized by the external devices.

The autonomous driving vehicle 100b may perform the above-described operations based on a learning model configured with at least one ANN. For example, the autonomous driving vehicle 100b may recognize the surrounding environment and objects based on the learning model and determine the driving path based on the recognized surrounding environment and objects. The learning model may be trained by the autonomous driving vehicle 100a or an external device such as the AI server 200.

The autonomous driving vehicle 100b may operate by directly generating a result based on the learning model. Alternatively, the autonomous driving vehicle 100b may transmit sensor information to the external device such as the AI server 200 and receive a result generated based on the sensor information.

The autonomous driving vehicle 100b may determine the travel route and driving plan based on at least one of the map data, the object information detected from the sensor information, or the object information obtained from the external device. Then, the autonomous driving vehicle 100b may move according to the determined travel path and driving plan under control of its driving unit.

The map data may include object identification information about various objects placed in a space (e.g., road) in which the autonomous driving vehicle 100b moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100b may operate and move by controlling the driving unit based on the user control/interaction. In this case, the autonomous driving vehicle 100b may obtain intention information from the motion or speech of a user and determine a response based on the obtained intention information.

<AI+XR>

When the AI technology is applied to the XR device 100c, the XR device 100c may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100c may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100c may output an XR object including information about a recognized object, that is, by matching the XR object with the recognized object.

The XR device 100c may perform the above-described operations based on a learning model configured with at least one ANN. For example, the XR device 100c may recognize the real object from the three-dimensional point cloud data or image data based on the learning model and provide information corresponding to the recognized real object. The learning model may be directly trained by the XR device 100c or an external device such as the AI server 200.

The XR device 100c may operate by directly generating a result based on the learning model. Alternatively, the XR device 100c may transmit sensor information to the external device such as the AI server 200 and receive a result generated based on the sensor information.

<AI+Robot+Autonomous Driving>

When the AI technology and the autonomous driving technology are applied to the robot 100a, the robot 100a may be implemented as a guide robot, a transport robot, a cleaning robot, a wearable robot, an entertainment robot, a pet robot, an unmanned flying robot, etc.

The robot 100a to which the AI technology and the autonomous driving technology are applied may refer to the robot 100a with the autonomous driving function or the robot 100a interacting with the autonomous driving vehicle 100b.

The robot 100a having the autonomous driving function may be collectively referred to as a device that move along a given movement path without human control or a device that moves by autonomously determining its movement path.

The robot 100a having the autonomous driving function and the autonomous driving vehicle 100b may use a common sensing method to determine either a travel route or a driving plan. For example, the robot 100a having the autonomous driving function and the autonomous driving vehicle 100b may determine either the travel route or the driving plan based on information sensed through a LIDAR, a radar, and a camera.

The robot 100a interacting with the autonomous driving vehicle 100b may exist separately from with the autonomous driving vehicle 100b. That is, the robot 100a may perform operations associated with the autonomous driving function inside or outside the autonomous driving vehicle 100b or interwork with a user on the autonomous driving vehicle 100b.

The robot 100a interacting with the autonomous driving vehicle 100b may control or assist the autonomous driving function of the autonomous driving vehicle 100b by obtaining sensor information on behalf of the autonomous driving vehicle 100b and providing the sensor information to the autonomous driving vehicle 100b or by obtaining sensor information, generating environment information or object information, and providing the information to the autonomous driving vehicle 100b.

Alternatively, the robot 100a interacting with the autonomous driving vehicle 100b may monitor the user on the autonomous driving vehicle 100b or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

<AI+Robot+XR>

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

<AI+Autonomous Driving+XR>

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user looks at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera, the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

Now, multiple use cases in a 5G communication system including the NR system will be described in detail.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional tasks and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both tasks and entertainment. The cloud storage is a special use case which accelerates growth of an uplink data transmission rate. 5G is also used for a remote task of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 20.4 billion up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential for smart grid control, industrial automation, robotics, and drone control and adjustment.

Next, a plurality of use cases in the 5G communication system including the NR system will be described in more detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Figure 4:
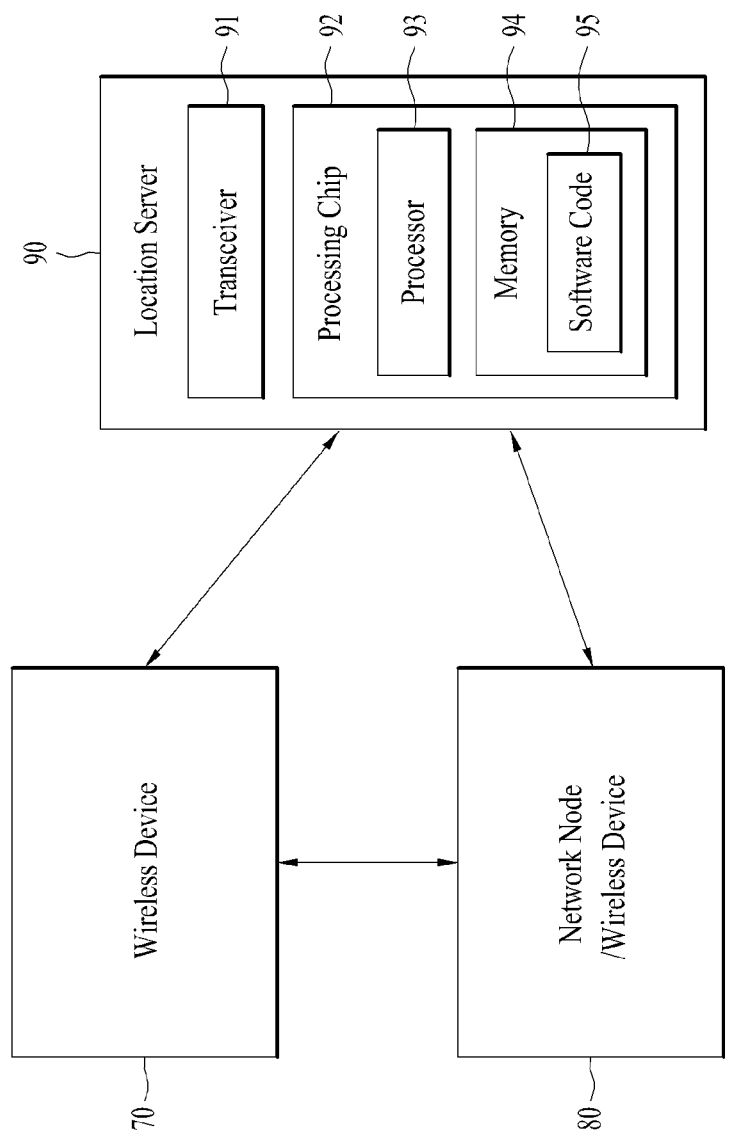
FIG. 4 and FIG. 5 are block diagrams illustrating components of a wireless device for implementing the present disclosure.

FIG. 4 illustrates one embodiment of a location server 90 according to an embodiment of the present disclosure.

Meanwhile, to perform embodiments of the present disclosure, the location server 90 shown in FIG. 4 may be included. The location server 90 may be logically or physically connected to a wireless device 70 and/or a network node 80. Here, for example, the wireless device 70 may include a User Equipment (UE) and the network node may include a Base Station (BS).

The location server 90 may be, without being limited to, an AMF, an LMF, an E-SMLC, and/or an SLP and may be any device only if the device serves as the location server 90 for implementing the embodiments of the present disclosure. Although the location server 90 is referred to as a location server for convenience of description, the location server 90 may be implemented not as a server but as a chip. Such a chip may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions to the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 19 to transmit and receive information.

The processing chip 92 includes a memory 94 configured to store data, programmable software code, and/or other information for performing the embodiments described in this specification.

Figure 19:
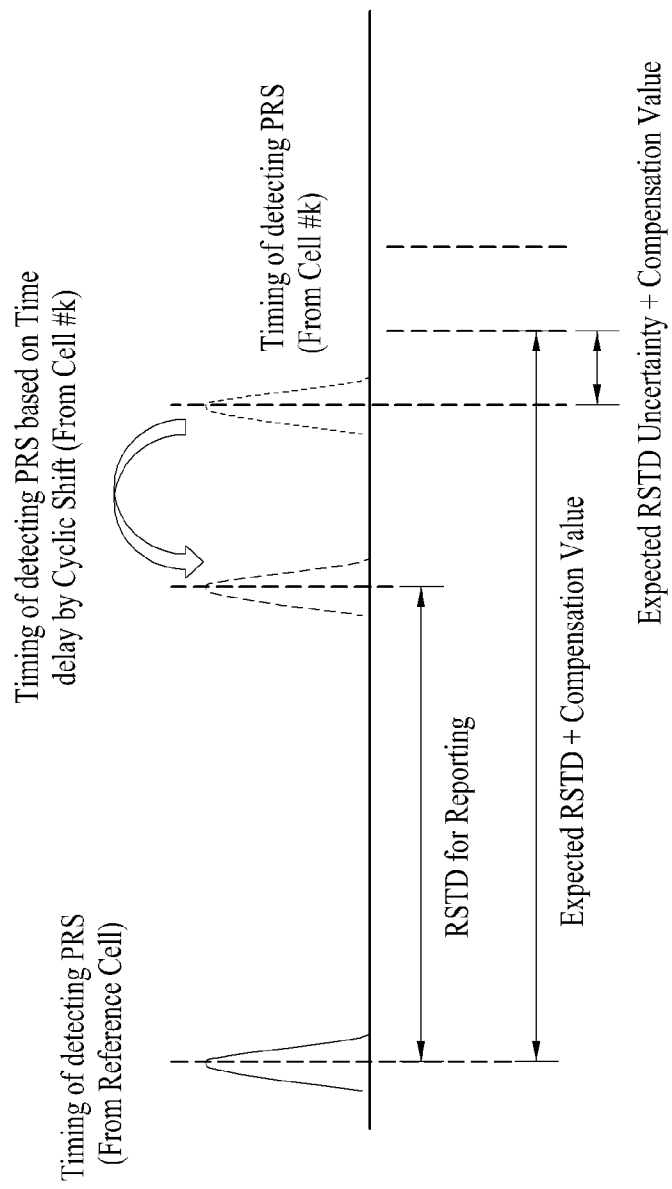
FIG. 19 and FIG. 20 are diagrams to describe an example of PRS sequence generation and an example of Reference Signal Time Difference (RSTD) measurement according to an embodiment of the present disclosure.

In other words, in the embodiments according to the present specification, when the memory 94 is executed by at least one processor such as the processor 93, the memory 94 allows the processor 93 to perform some or all of the processes controlled by the processor 93 of FIG. 19 or stores software code 95 including instructions for performing the embodiments described in this specification.

Specifically, the processing chip 92 may control the transceiver 91 to transmit common information of a cell group and cell-independent (or cell-specific) information on each BS/TP included in the cell group through a PLL protocol. Here, as the common information of the cell group, information such as a cell group ID for PRS initialization, an expected RSTD value, an expected RSTD uncertainty and the like may be included. As the cell-independent (or cell-specific information), at least one of cyclic shift information per BS/TP included in the cell group, actual time shift information and DFT sequence information and an expected RSTD compensation value, an expected RSTD uncertainty compensation value and the like may be included.

The processing chip 92 may control the transceiver 91 to transmit a positioning information request message that makes a request for measuring a location of a UE to a BS. In addition, the processing chip 92 may control the transceiver 91 to receive a cell ID, an SFN for PRS transmission, an SFN, positioning information such as bandwidth information for PRS transmission and the like from the BS.

In this case, the positioning information may contain a cell group ID, cyclic shift information of each BS included in a cell group, actual time shift information, DFT sequence information and the like. If the positioning information includes information such as cell group ID, cyclic shift information of each BS included in a cell group, actual time shift information, DFT sequence information and the like, after positioning request message transmission and positioning information reception, cell group common information and cell-independent (or cell-specific) information may be transmitted to the UE. The processing chip 92 may control the transceiver 91 to receive an RSTD measured by the UE and may estimate a location of the UE through OTDOA based on the received RSTD values. Other specific operations of the location server may be based on embodiments described below.

Figure 5:
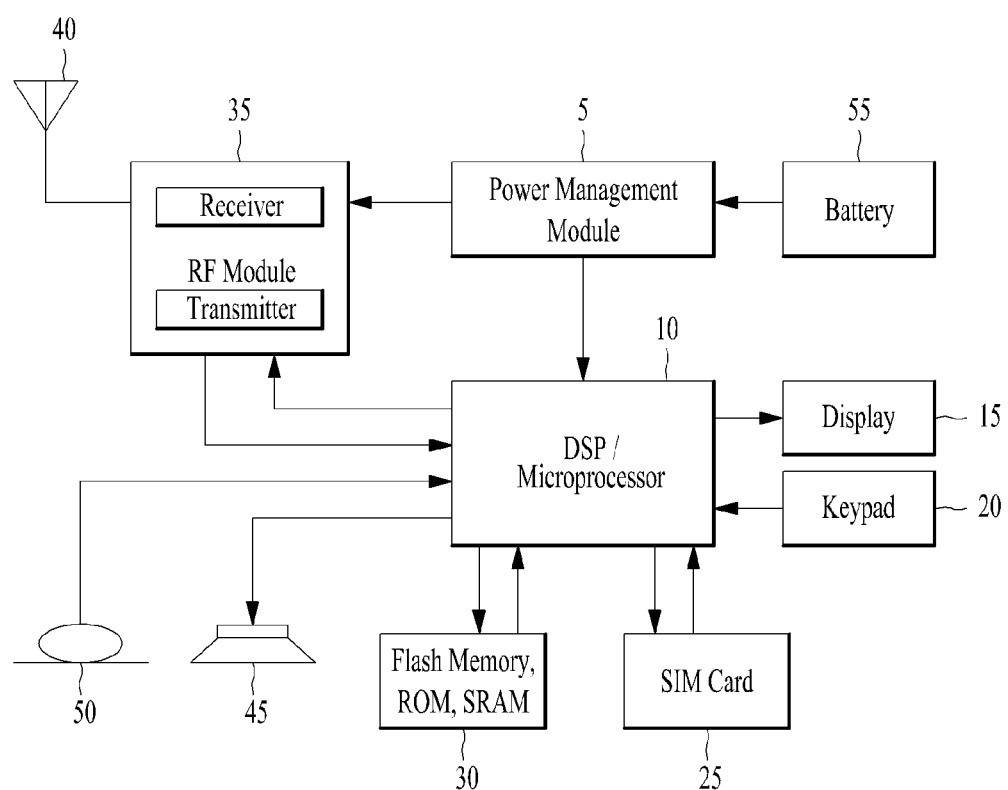

FIG. 5 illustrates an example of a wireless communication device according to an embodiment of the present disclosure.

The wireless communication device illustrated in FIG. 5 may represent a UE and/or a BS according to an embodiment of the present disclosure. However, the wireless communication device of FIG. 5 may be replaced with any of various types of devices such as a vehicle communication system or device, a wearable device, and a laptop, not limited to the UE and/or the BS according to the embodiment of the present disclosure. More specifically, the above device may be a BS, a network node, a Tx UE, an Rx UE, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, a machine-type communication (MTC) device, an Internet of things (IoT) device, a medical device, a FinTech device (or a financial device), a security device, a weather/environment device, or a device related to the fourth industrial revolution or a 5G service. The UAV may be, for example, an aircraft without a human being onboard, which aviates by a wireless control signal. The MTC device and the IoT device may be, for example, devices that do not require direct human intervention or manipulation and may include smartmeters, vending machines, thermometers, smartbulbs, door locks, or various sensors. The medical device may be, for example, a device used for the purpose of diagnosing, treating, relieving, curing, or preventing disease or a device used for the purpose of inspecting, replacing, or modifying a structure or a function and may include a device for treatment, a device for operation, a device for (in vitro) diagnosis, a hearing aid, or an operation device. The security device may be, for example, a device installed to prevent a danger that may arise and to maintain safety and may include a camera, a CCTV, or a black box. The FinTech device may be, for example, a device capable of providing a financial service such as mobile payment and may include a payment device or a point of sale (POS) system. The weather/environment device may be, for example, a device for monitoring or predicting a weather/environment.

The Tx UE or the Rx UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), or a foldable device. The HMD may be, for example, a type of display device that is worn on the head and may be used to implement VR or AR.

In the example of FIG. 5, the UE and/or the BS according to the embodiment of the present disclosure includes at least one processor 10 such as a digital signal processor or a microprocessor, a transceiver 35, a power management module 5, an antenna 40, a battery 55, a display 15, a keypad 20, a memory 30, a subscriber identity module (SIM) card 25, a speaker 45, and a microphone 50. In addition, the UE and/or the BS may include one or more antennas. The transceiver 35 may be also referred to as an RF module.

The at least one processor 10 may be configured to implement the functions, procedures and/or methods described with reference to FIGS. 6 to 24. In at least some of the embodiments described with reference to FIGS. 6 to 24, the at least one processor 10 may implement one or more protocols, such as layers of radio interface protocols (e.g., functional layers).

The memory 30 is coupled to the at least one processor 10 and stores information related to the operations of the at least one processor 10. The memory 30 may be located inside or outside the at least one processor 10 and may be coupled to the at least one processor 10 by various techniques such as wired or wireless communication.

A user may input various types of information (e.g., indication information such as a telephone number) by various techniques such as pressing a button on the keypad 20 or activating voice using the microphone 50. The at least one processor 10 executes appropriate functions such as receiving and/or processing information of the user and dialing a telephone number.

It is also possible to retrieve data (e.g., operational data) from the SIM card 25 or the memory 30 to execute the appropriate functions. In addition, the at least one processor 10 may receive and process global positioning system (GPS) information from a GPS chip to obtain location information about the UE and/or the BS such as in vehicle navigation, map service, or the like, or execute functions related to the location information. Further, the at least one processor 10 may display these various types of information and data on the display 15 for reference and user convenience.

The transceiver 35 is coupled to the at least one processor 10 to transmit and/or receive wireless signals such as RF signals. The at least one processor 10 may control the transceiver 35 to initiate communication and transmit wireless signals including various types of information or data, such as voice communication data. The transceiver 35 may include a receiver for receiving a wireless signal and a transmitter for transmitting a wireless signal. The antenna 40 facilitates the transmission and reception of wireless signals. In some embodiments, upon receipt of a wireless signal, the transceiver 35 may forward and convert the signal to a baseband frequency for processing by the at least one processor 10. The processed signal may be processed according to various techniques, such as being converted into audible or readable information, and output through the speaker 45.

In some embodiments, a sensor may also be coupled to the at least one processor 10. The sensor may include one or more sensing devices configured to detect various types of information, including velocity, acceleration, light, vibration, and the like. The at least one processor 10 receives and processes sensor information obtained from the sensor, such as proximity, position, image, and the like, thereby executing various functions such as collision avoidance and autonomous driving.

Various components such as a camera and a universal serial bus (USB) port may further be included in the UE and/or the BS. For example, a camera may further be coupled to the at least one processor 10, for use in various services including autonomous driving and vehicle safety services.

FIG. 5 merely illustrates one example of devices included in a UE and/or a BS, not limiting the present disclosure. For example, some components, such as the keypad 20, the GPS chip, the sensor, the speaker 45 and/or the microphone 50 may be excluded from UE and/or BS implementation in some embodiments.

Specifically, in order to implement embodiments of the present disclosure, when a wireless communication device shown in FIG. 5 is a UE according to an embodiment of the present disclosure, a corresponding operation will be described as follows. If the wireless communication device shown in FIG. 5 is a UE according to an embodiment of the present disclosure, the processor 10 may control the transceiver 35 to receive common information of a cell group and cell-independent (or cell-specific) information on each BS/TP included in the cell group from the location server through a PLL protocol. Here, as the common information of the cell group, information such as a cell group ID for PRS initialization, an expected RSTD value, an expected RSTD uncertainty and the like may be included. As the cell-independent (or cell-specific information), at least one of cyclic shift information per BS/TP included in the cell group, actual time shift information and DFT sequence information and an expected RSTD compensation value, an expected RSTD uncertainty compensation value and the like may be included.

The processor 10 may configure a PRS search window for detecting a PRS using informations such as an expected RSTD value, an expected RSTD uncertainty, a per-BS/TP expected RSTD compensation value, an expected RSTD uncertainty compensation value and the like. In addition, the processor 10 may initialize a PRS based on cell group ID information and then generate a PRS sequence. In addition, the processor 10 may detect a PRS by performing correlation on a PRS within the PRS search window configured per BS/TP based on the PRS sequence. Thereafter, the processor 10 may control the transceiver 35 to measure an RSTD by reflecting cyclic shift information, actual time shift information, DFT sequence information and the like included in the cell-independent (or cell-specific) information received from the location server and report the measured RSTD to the location server. In some implementations, a specific method for the processor 10 to measure an RSTD may be based on embodiments of the present disclosure described below.

Meanwhile, to implement embodiments of the present disclosure, in case that a wireless communication device illustrated in FIG. 5 is a BS according to an embodiment of the present disclosure, the processor 10 may control the transceiver 35 to receive a positioning information request message for requesting to measure a location of a UE from the location server. The processor 10 may control it to transmit positioning information such as a cell ID, an SFN for PRS transmission, bandwidth information for PRS transmission and the like to the location server. In this case, the positioning information may include cyclic shift information of each BS included in a cell group ID and a cell group, actual time shift information, DFT sequence information and the like. Thereafter, the processor 10 may generate a PRS sequence and control it to be transmitted to a UE. Meanwhile, a specific method for the processor 10 to generate a PRS sequence may be based on embodiments of the present disclosure described below.

Figure 6:
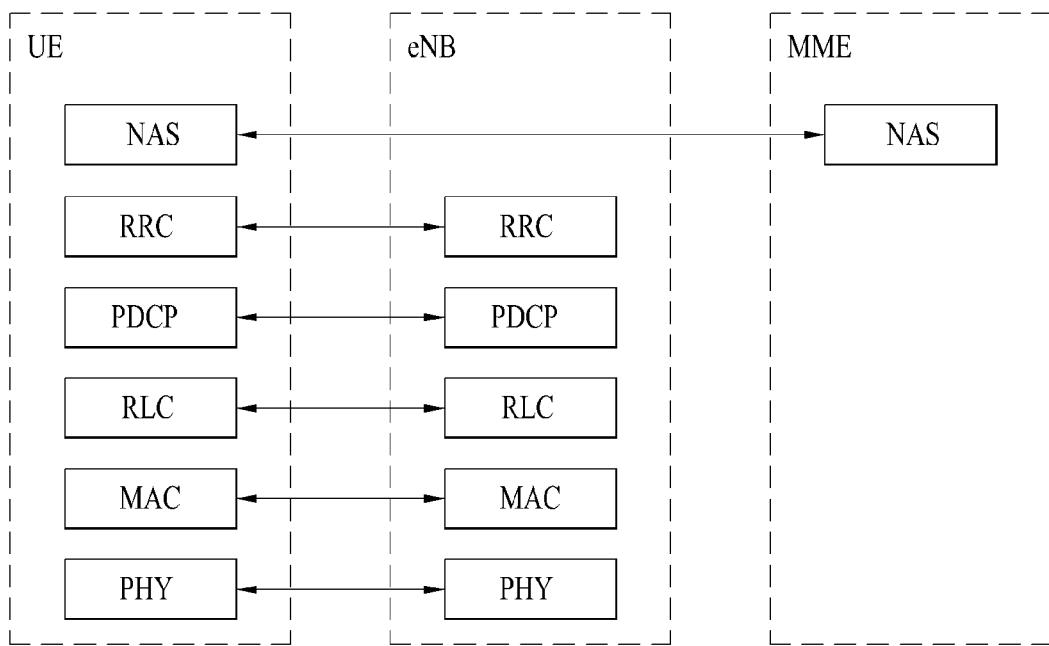
FIG. 6 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 6:
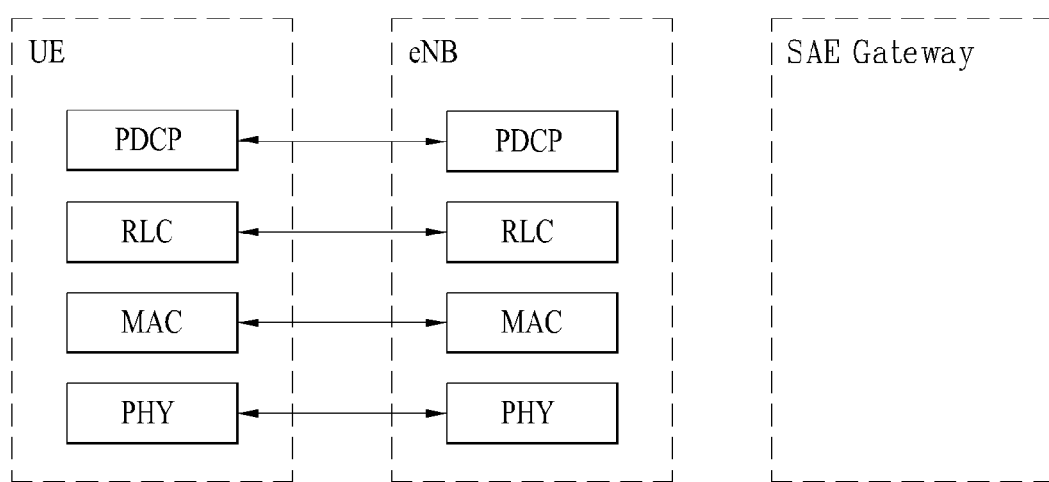

FIG. 6 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

Figure 7:
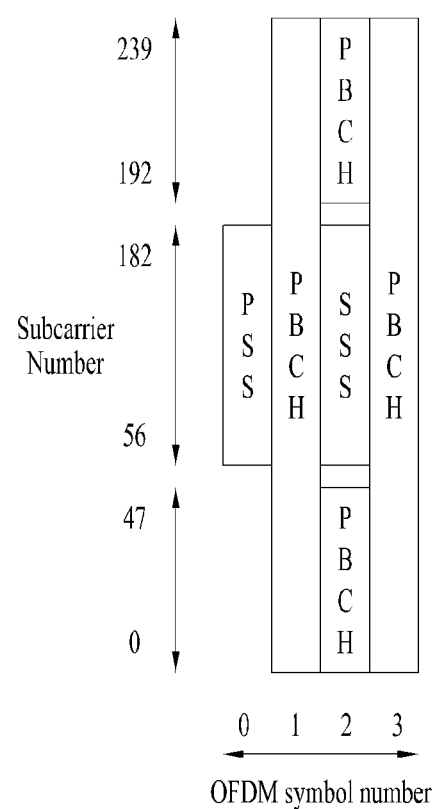
FIG. 7 and FIG. 8 are diagrams illustrating the composition of a synchronization signal/physical broadcast channel (SS/PBCH) block and a method of transmitting an SS/PBCH block.

FIG. 7 illustrates an SSB structure. The UE may perform cell search, system information acquisition, beam alignment for initial access, DL measurement, and so on based on an SSB. The term SSB is used interchangeably with synchronization signal/physical broadcast channel (SS/PBCH) block.

Referring to FIG. 7, an SSB is composed of a PSS, an SSS, and a PBCH. The SSB includes four consecutive OFDM symbols. The PSS, the PBCH, the SSS/PBCH, and the PBCH are transmitted on the respective OFDM symbols. Each of the PSS and the SSS includes one OFDM symbol and 127 subcarriers, and the PBCH includes 3 OFDM symbols and 576 subcarriers. Polar coding and quadrature phase shift keying (QPSK) are applied to the PBCH. The PBCH includes data REs and demodulation reference signal (DMRS) REs in each OFDM symbol. There are three DMRS REs per RB, with three data REs between every two adjacent DMRS REs.

The cell search refers to a procedure in which the UE obtains time/frequency synchronization of a cell and detects a cell ID (e.g., physical layer cell ID (PCID)) of the cell. The PSS may be used in detecting a cell ID within a cell ID group, and the SSS may be used in detecting a cell ID group. The PBCH may be used in detecting an SSB (time) index and a half-frame.

The cell search procedure of the UE may be summarized as described in Table 1 below.

TABLE 1

| Type of Signals | Operations |
|---|---|
| 1$^{st}$ step PSS | SS/PBCH block (SSB) symbol timing acquisition |

TABLE 1-continued

| | Type of Signals | Operations |
|---|---|---|
| | | Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF) Remaining Minimum System Information (RMSI) Control resource set (CORESET)/ Search space configuration |
| $5^{th}$ Step | PDCCH and PDSCH | Cell access information RACH configuration |

There may be 336 cell ID groups, and each cell ID group may have three cell IDs. There may be 1008 cell IDs in total. Information about a cell ID group to which a cell ID of a cell belongs may be provided/obtained through the SSS of the cell, and information about the cell ID among 336 cells in the cell ID may be provided/obtained through the PSS.

Figure 8:
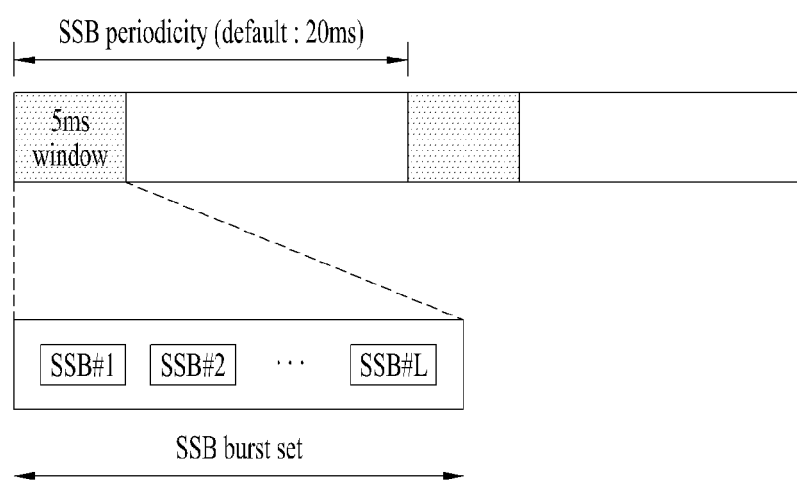

FIG. 8 illustrates SSB transmission. Referring to FIG. 8, an SSB is periodically transmitted according to the SSB periodicity. The basic SSB periodicity assumed by the UE in the initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set may be configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to the SCS as follows. The time positions of SSB candidates are indexed as (SSB indexes) 0 to L−1 in temporal order within the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for a carrier frequency equal to or lower than 3 GHz, and n=0, 1 for a carrier frequency of 3 GHz to 6 GHz.

Case C—30-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for a carrier frequency above 6 GHz.

A random access procedure of a UE may be summarized as Table 2 and FIG. 5.

TABLE 2

| | Signal type | Acquired operation/information |
|---|---|---|
| $1^{st}$ step | PRACH preamble in UL | Initial beam acquisition Random selection of random access preamble ID |
| $2^{nd}$ step | Random access response on PDSCH | Timing advance information Random access preamble ID Initial UL grant, temporary C-RNTI |
| $3^{rd}$ step | UL transmission on PUSCH | RRC connection request UE identifier |
| $4^{th}$ step | Contention resolution in DL | Temporary C-RNTI on PDCCH for initial access C-RNTI on PDCCH for UE in RRC_CONNECTED |

Figure 9:
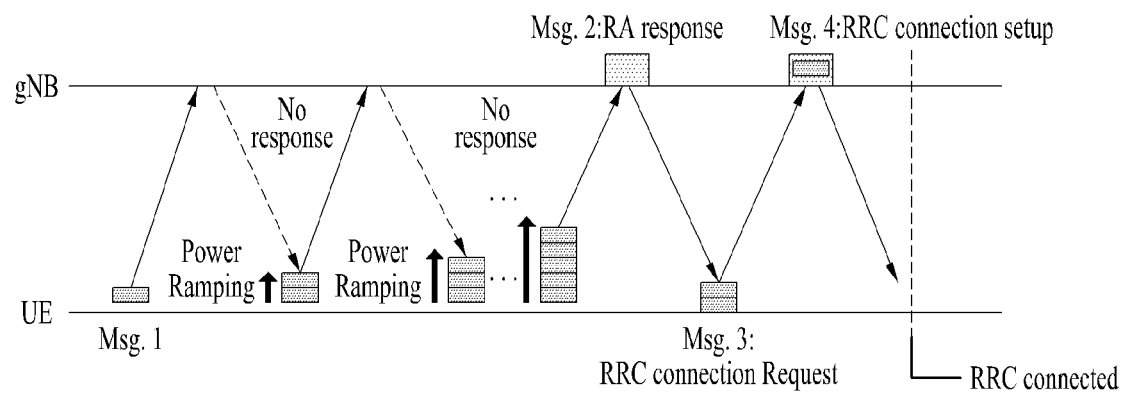
FIG. 9 is a diagram illustrating a random access procedure.

A random access procedure is used for various usages. For example, a random access procedure may be usable for network initial access, handover, and UE triggered UL data transmission. A UE may acquire UL synchronization and UL transmission resources through the random access procedure. The random access procedure is classified into a contention-based random access procedure or a contention-free random access procedure. FIG. 9 shows one example of a random access procedure. Specifically, FIG. 9 illustrates a contention-based random access procedure.

First of all, a UE may transmit a random access preamble as Msg1 of a random access procedure in UL through PRACH.

Random access preamble sequences having two different lengths are supported. A long sequence length 839 is applied for subcarrier spacings of 1.25 kHz and 5 kHz, while a short sequence length 139 is applied for subcarrier spacings of 15, 30, 60 and 120 kHz.

A multitude of preamble formats are defined by one or more RACH OFDM symbols and different cyclic prefixes (and/or guard times). RACH configuration for a cell is provided to a UE in a manner of being included in system information of the cell. The RACH configuration includes information on a subcarrier spacing of PRACH, available preambles, a preamble format and the like. The RACH configuration includes association information between SSBs and RACH (time-frequency) resources. The UE transmits a random access preamble on a RACH time-frequency resource associated with a detected or selected SSB.

A threshold of an SSB for RACH resource association may be configured by a network, and a transmission or retransmission of an RACH preamble is performed on an SSB of which Reference Signal Received Power (RSRP) measured based on the SSB meets the threshold. For example, a UE may select one of SSB(s) meeting the threshold and transmit or retransmit an RACH preamble based on an RACH resource associated with the selected SSB.

If a BS receives a random access preamble from a UE, the BS transmits a Random Access Response (RAR) message (Msg2) to the UE. PDCCH for scheduling PDSCH that caries the RAR is transmitted in a manner of being CRC-masked with a Random Access-Radio Network Temporary Identifier (RA-RNTI). Having detected the PDCCH masked with the RA-RNTI, the UE may receive the RAR on the PDSCH scheduled by a DCI carried by the PDCCH. The UE checks whether the preamble transmitted by the UE, i.e., random access response information on the MSg1 exists in the RAR. Whether the random access information on the MSg1 transmitted by the UE exists may be determined by whether a random access preamble ID for the preamble transmitted by the UE exists. If there is no response to the Msg1, the UE may retransmit the RACH preamble as many times as a prescribed count while performing power ramping. The UE calculates a PRACH transmission power for the preamble retransmission based on the latest pathloss and power ramping counter.

Random access response information includes timing advance information for UL synchronization, UL grant and UE temporary cell RNTI. If a UE receives random access response information on itself through PDSCH, the UE may obtain timing advance information for UL synchronization, initial UL grant and UE temporary Cell-RNTI (C-RNTI). The timing advance information is used to control a UL signal transmission timing. In order for PUSCH/PUCCH transmission by a UE to be further well aligned with a subframe timing in a network stage, a network (e.g., BS) may measure a time difference between a PUSCH/PUCCH/SRS reception and a subframe and then send timing advance information based on it. The UE may send a UL transmission as an Msg3 of a random access procedure on an uplink shared channel based on random access response information. The Msg3 may include an RRC connection request and a UE identifier. In response to the Msg3, the network may send a Msg4, which may be handled as a contention resolution message in DL. By receiving the Msg4, the UE may enter an RRC connected state.

Meanwhile, a contention-free random access procedure may be used in a process for a UE to hand over into another cell or BS or executed in case of being requested by a BS's command. A basic process of the contention-free random access procedure is similar to a contention based random access procedure. Yet, in a contention-free random access procedure, unlike a contention based random access procedure that a UE randomly selects a preamble to use from a plurality of random access preambles, a preamble to be used by a UE (hereinafter, referred to as a dedicated random access preamble) is allocated to the UE by a BS. Information on the dedicated random access preamble may be included in an RRC message (e.g., a handover command) or provided to the UE through a PDCCH order. Once a random access procedure is initiated, a UE transmits a dedicated random access preamble to a BS. If the UE receives the random access procedure from the BS, the random access procedure is completed.

As described above, a UL grant in an RAR schedules a PUSCH transmission to a UE. PUSCH that carries an initial UL transmission by a UL grant in an RAR will be referred to as Msg3 PUSCH. A content of an RAR UL grant starts from an MSB and ends at an LSB, which is given by Table 3.

TABLE 3

| RAR UL grant field | Number of bits |
| --- | --- |
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A TPC command is used to determine transmission power of Msg3 PUSCH and, for example, interpreted according to Table 4.

TABLE 4

| TPC command | value [dB] |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a contention-free random access procedure, a CSI request field in an RAR UL grant indicates whether a UE will have an aperiodic CSI reporting included in a corresponding PUSCH transmission. A subcarrier spacing for Msg3 PUSCH transmission is provided by an RRC parameter. A UE will transmit PRACH and Msg3 PUSCH on the same UL carrier of the same service providing cell. A UL BWP for Msg3 PUSCH transmission is indicated by SystemInformationBlock1 (SIB1).

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$
$$m = 0, 1, \ldots, 2N_{RB}^{max,DL} - 1$$

where $n_s$ denotes a slot number in a radio frame and l denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by [Equation 2] below.

$$c_{init} = 2^{28} \cdot \lfloor N_{ID}^{PRS}/512 \rfloor + 2^{10} \cdot (7 \cdot (n_s+1)+l+1) \cdot (2 \cdot (N_{ID}^{PRS} \bmod 512)+1) + 2 \cdot (N_{ID}^{PRS} \bmod 512) + N_{CP}. \quad \text{[Equation 2]}$$

Unless additionally configured by higher layers, $N_{ID}^{PRS}$ is equal to $N_{ID}^{cell}$, and $N_{CP}$ is 1 for a normal CP and 0 for an extended CP.

Figure 10:
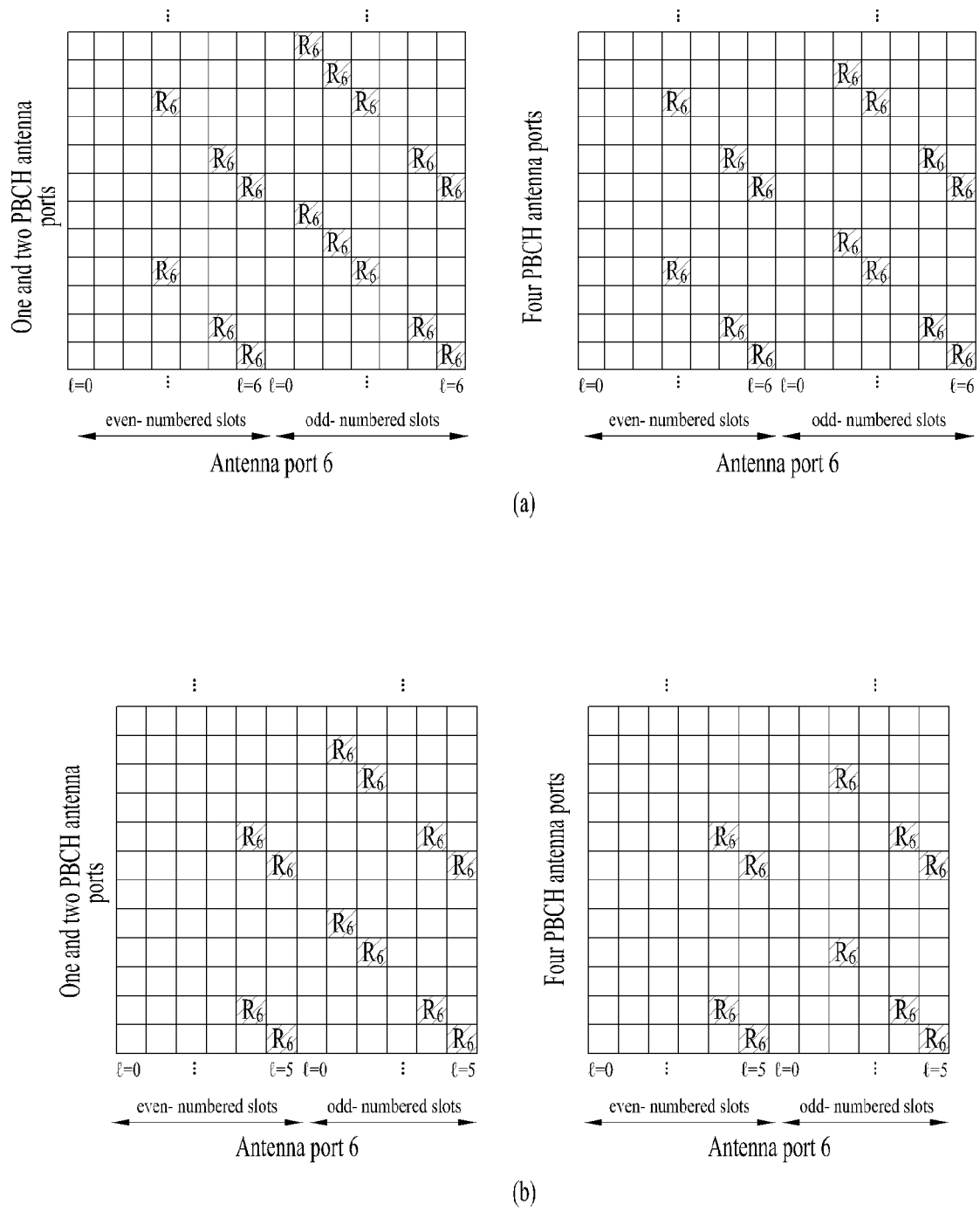
FIG. 10 illustrates an exemplary pattern to which a positioning reference signal (PRS) is mapped in a subframe in LTE system.

FIG. 10 illustrates an exemplary pattern to which a PRS is mapped in a subframe. As illustrated in FIG. 10, the PRS may be transmitted through an antenna port 6. FIG. 10(a) illustrates mapping of the PRS in the normal CP and FIG. 10(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in [Table 5] below.

TABLE 5

| PRS configuration Index ($I_{PRS}$) | PRS periodicity (subframes) | PRS subframe offset (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 11:
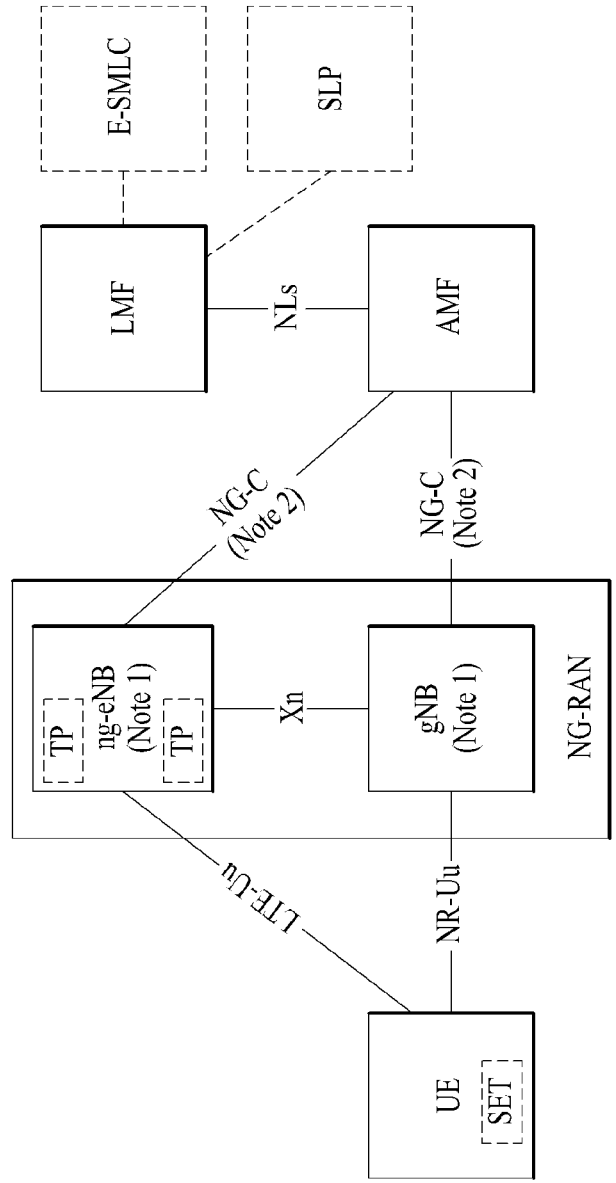
FIG. 11 and FIG. 12 are diagrams illustrating the architecture of a system for measuring the position of a UE and a procedure of measuring the position of the UE.

FIG. 11 illustrates the architecture of a 5G system applicable to positioning of a UE connected to a next generation-radio access network (NG-RAN) or an E-UTRAN.

Referring to FIG. 11, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 12:
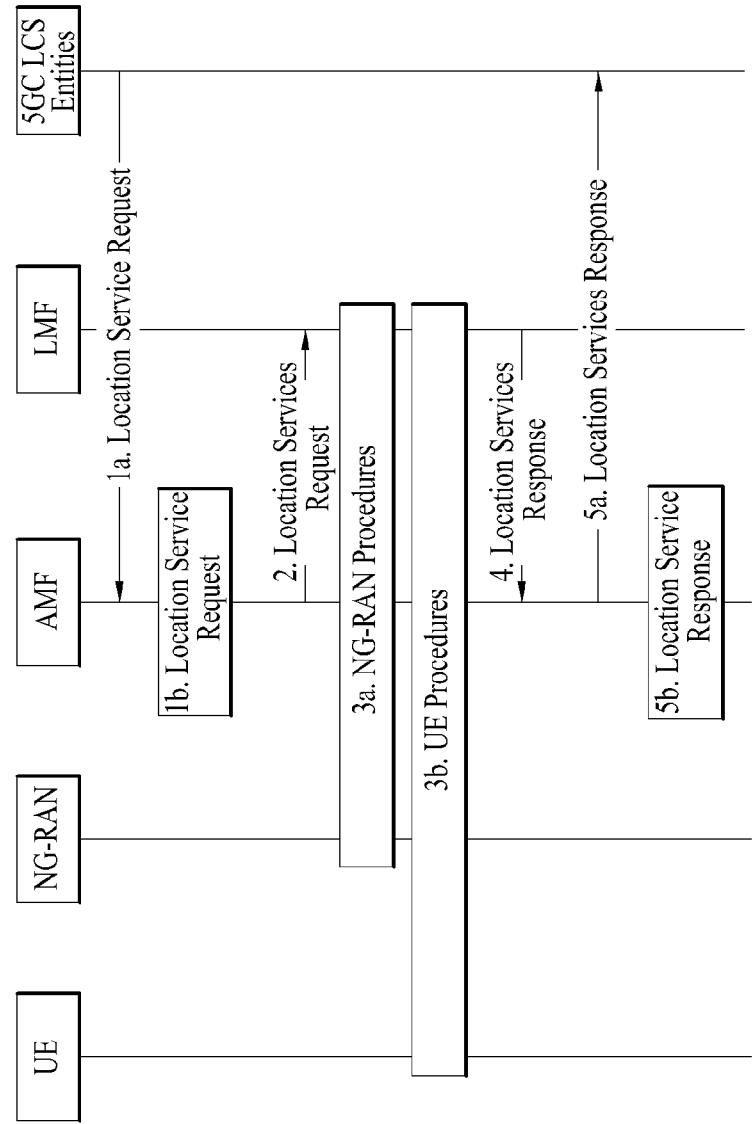

FIG. 12 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 12. In step 1a, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1b. For example, the serving AMF may determine that itself will perform the location service in order to measure the position of the UE for an emergency call.

In step 2, the AMF transfers the request for the location service to an LMF. In step 3a, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3a may be an NRPPa protocol which will be described later.

Additionally, in step 3b, the LMF may initiate a location procedure for DL positioning together with the UE. For example, the LMF may transmit the location assistance data to the UE or obtain a location estimate or location measurement value. For example, in step 3b, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3b, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3b, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 8 has been initiated by step 1b, the AMF may use the location service response in order to provide a location service related to an emergency call.

Protocol for Location Measurement (1) LTE Positioning Protocol (LPP)

Figure 13:
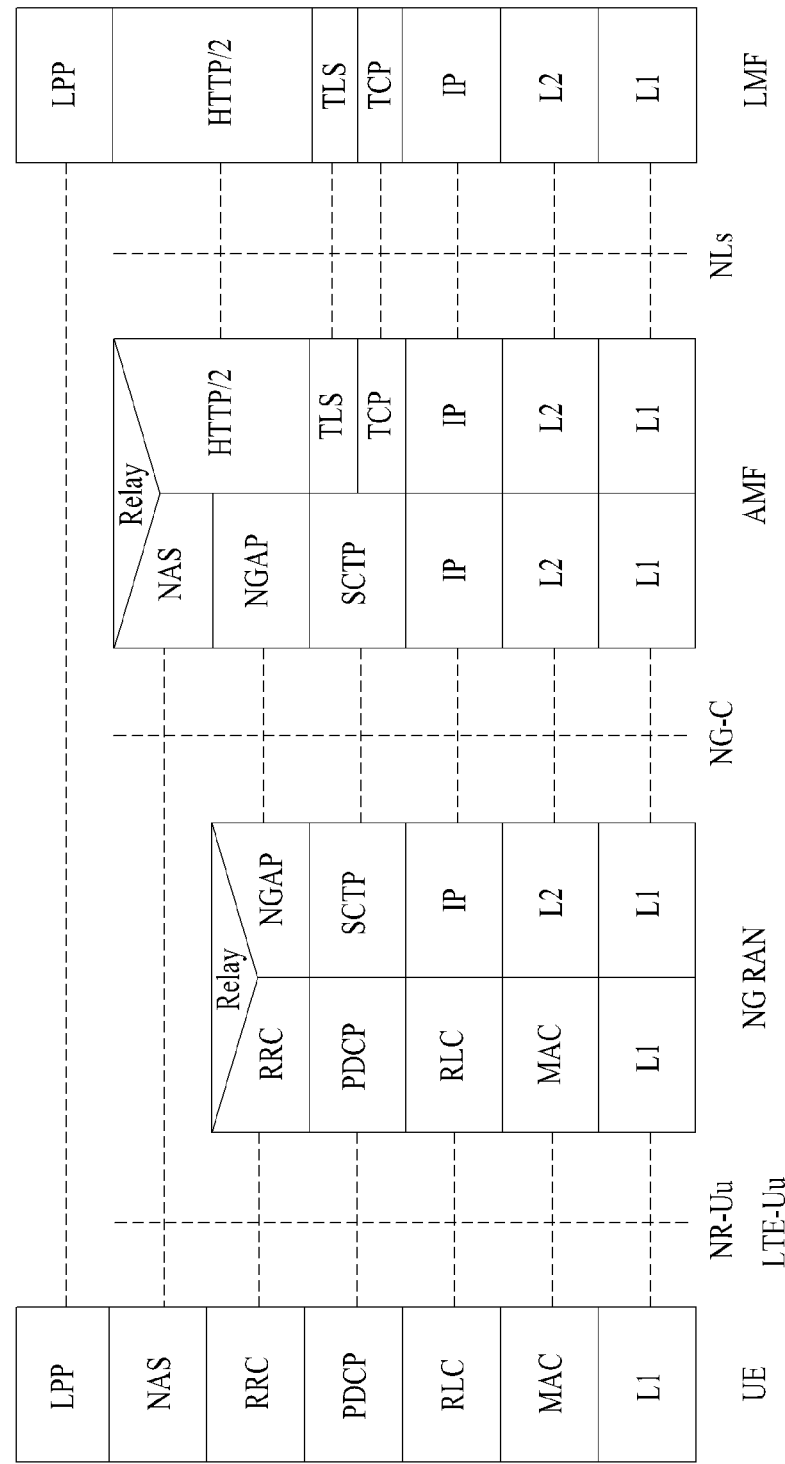
FIG. 13 illustrates an exemplary protocol layer used to support LTE positioning protocol (LPP) message transfer.

FIG. 13 illustrates an exemplary protocol layer used to support LPP message transfer between an LMF and a UE. An LPP protocol data unit (PDU) may be carried in a NAS PDU between an MAF and the UE. Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol A (NRPPa)

Figure 14:
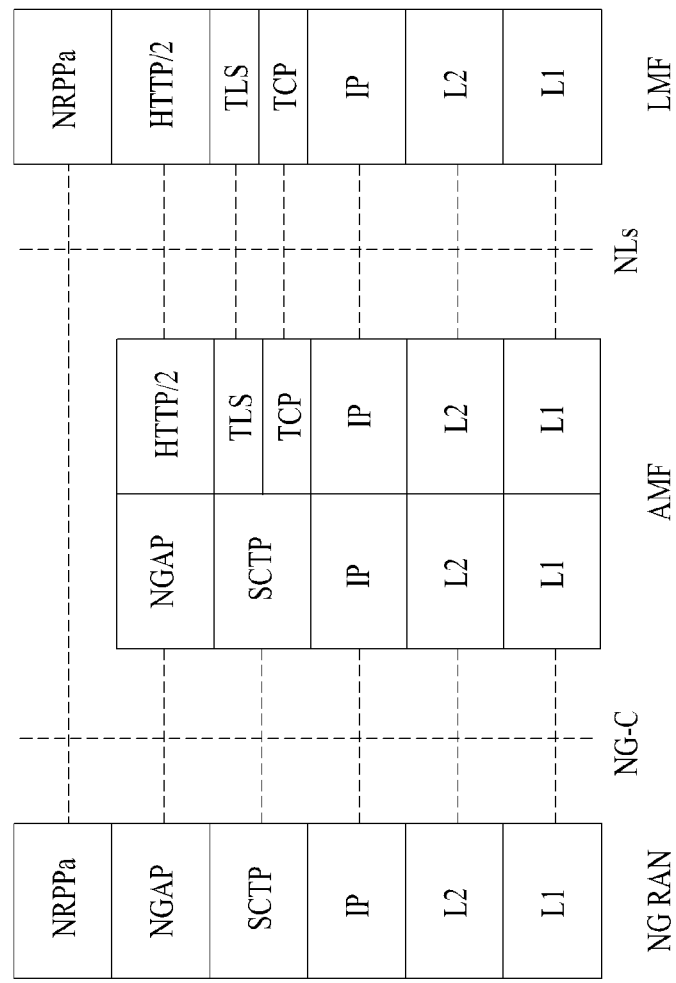
FIG. 14 is a diagram illustrating an exemplary protocol layer used to support NR positioning protocol A (NRPPa) protocol data unit (PDU) transfer.

FIG. 14 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 15:
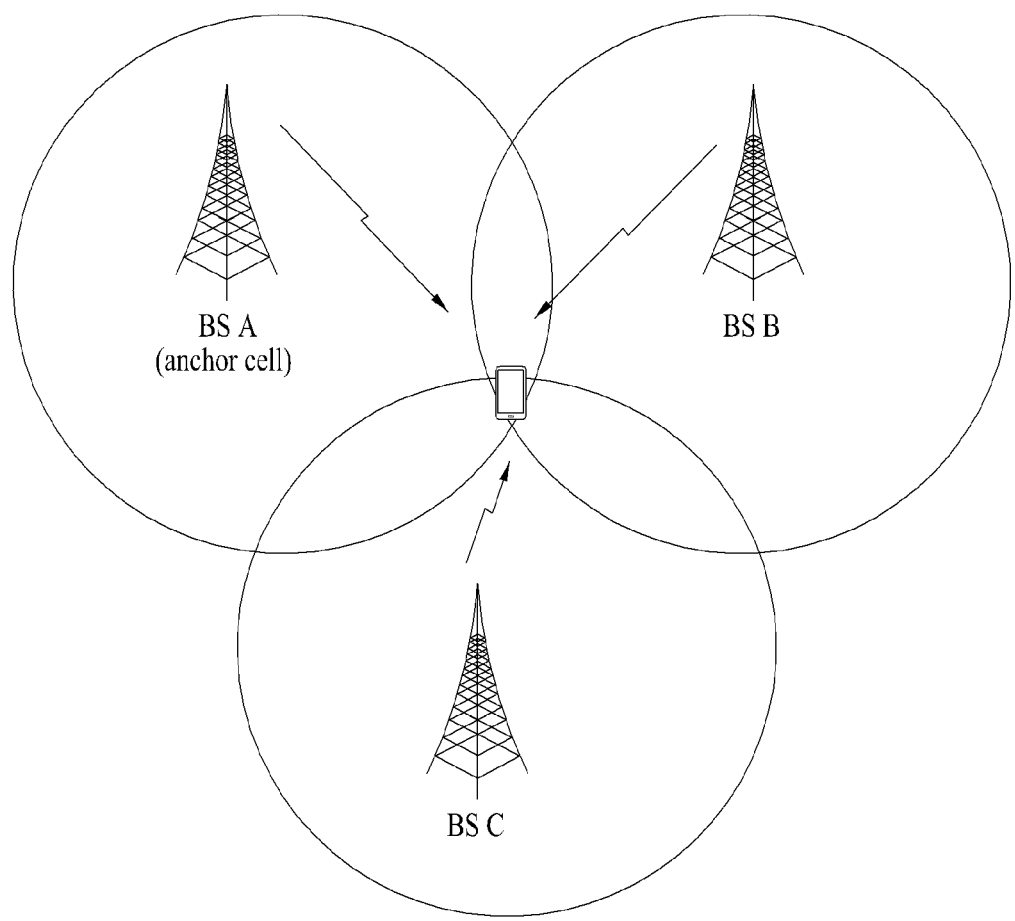
FIG. 15 is a diagram illustrating an embodiment of an observed time difference of arrival (OTDOA) positioning method.

FIG. 15 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$ [Equation 3]

where c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Echo E-UTRAN measurement: ng-eNB RX-TX time difference, timing advance ($T_{ADV}$), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Figure 16:
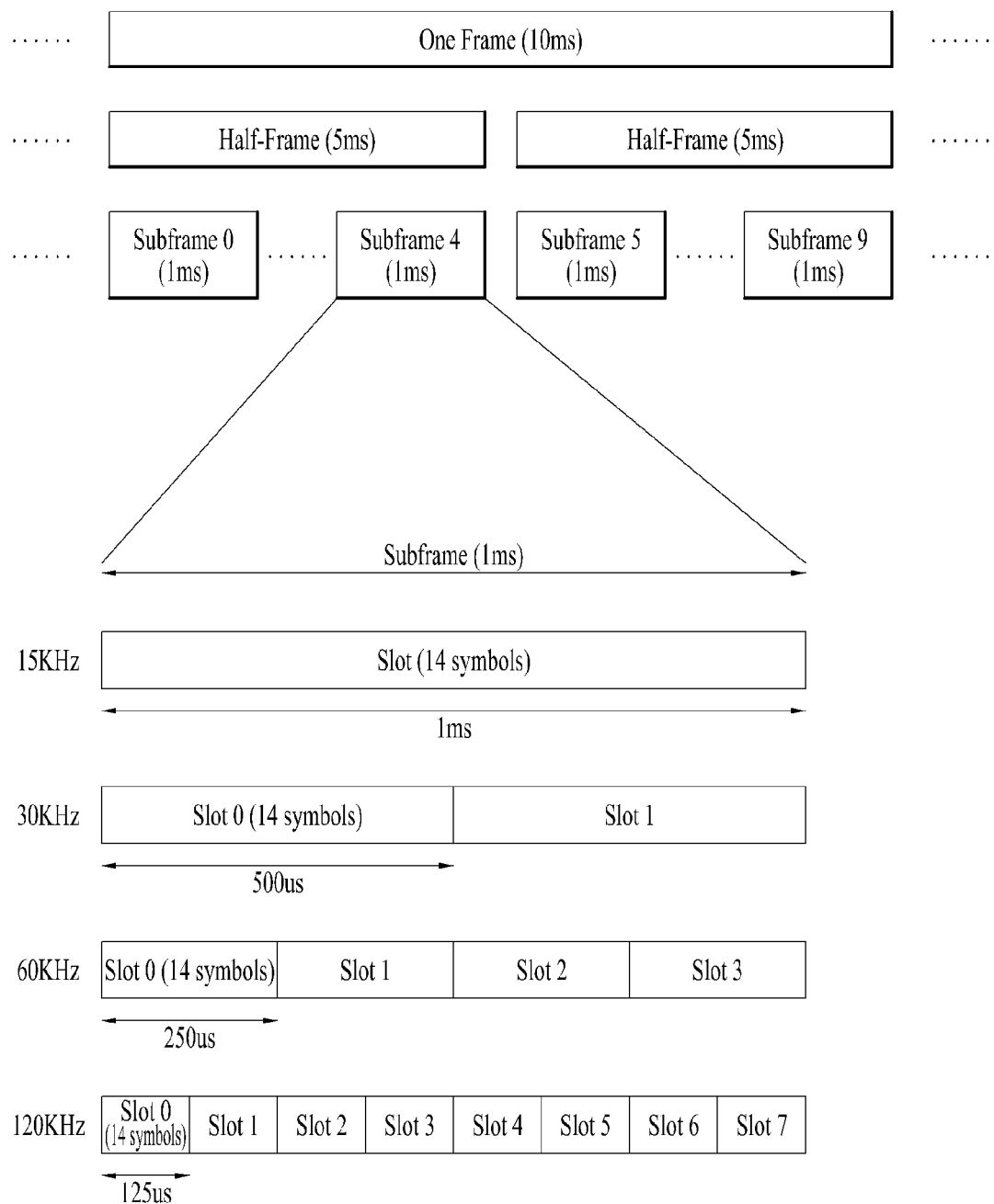
FIGS. 16 to 18 are diagrams illustrating structures of a radio frame and slots used in a new RAT (NR) system.

FIG. 16 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 6] illustrates that the number of symbols per slot, the number of slots per frame, and the number of slots per subframe vary according to the SCS when the normal CP is used.

TABLE 6

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot,
*$N^{frame,u}_{slot}$: Number of slots in a frame
*$N^{subframe,u}_{slot}$: Number of slots in a subframe

[Table 7] illustrates that the number of symbols per slot, the number of slots per frame, and the number of slots per subframe vary according to the SCS when the extended CP is used.

TABLE 7

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

Figure 17:
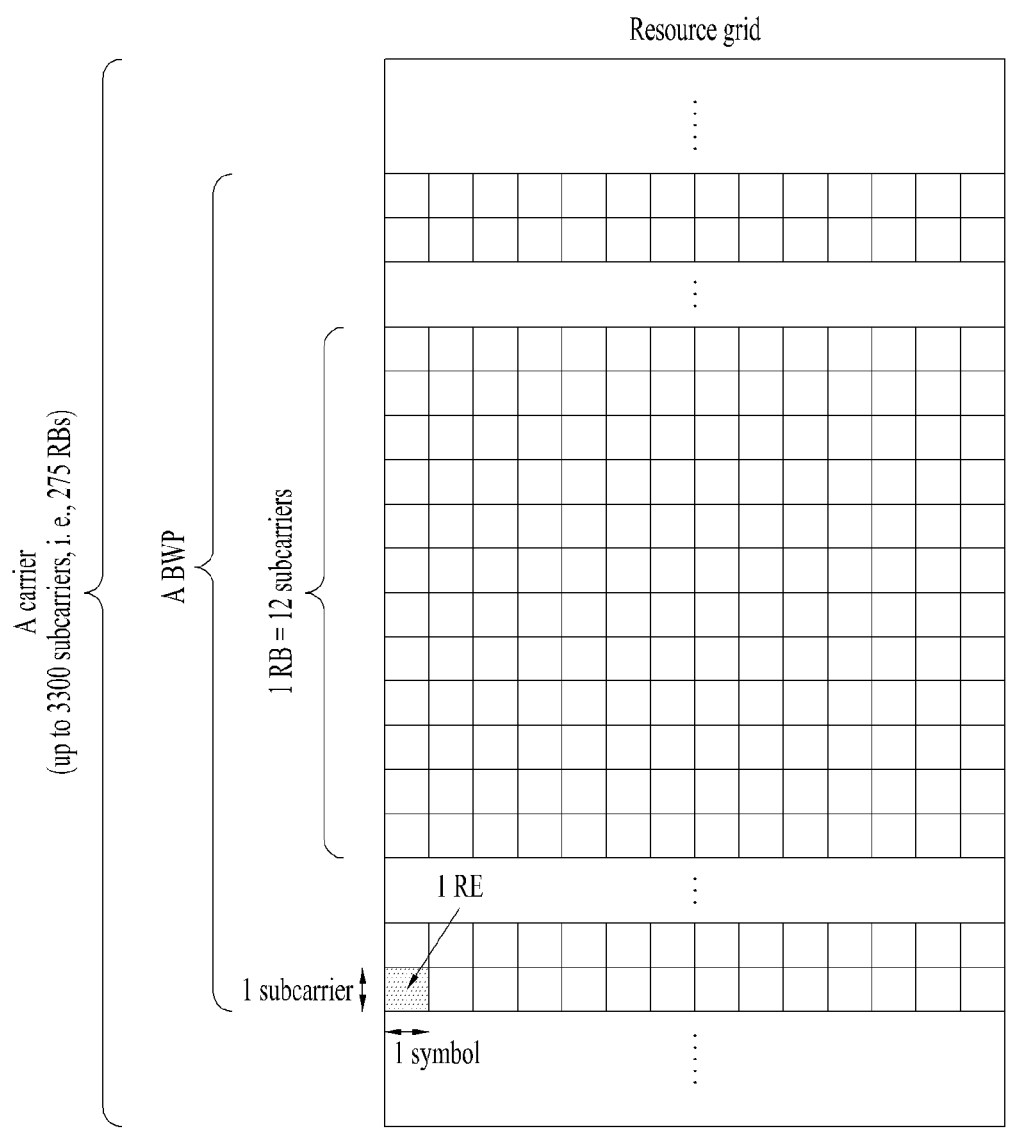

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells. FIG. 17 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 18:
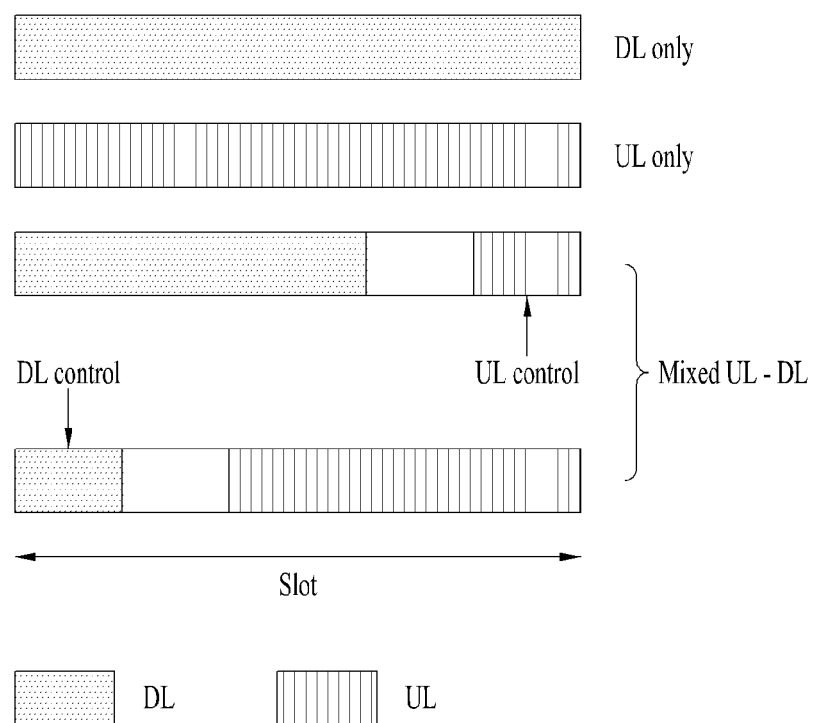

FIG. 18 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
    DL region+Guard period (GP)+UL control region
    DL control region+GP+UL region
    DL region: (i) DL data region, (ii) DL control region+DL data region
    UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

In the present disclosure, described is a scheme of designing a low-complexity Positioning Reference Sequence (PRS) usable to support a downlink positioning method in a system supportive of New RAT (NR).

A positioning method is a method for a UE to obtain its location through a relative distance from a BS by receiving a signal of the BS, which is described in the standard documents 36.355 and 36.455 in LTE. In the LTE, a method of Observed Time Difference Of Arrival (OTDOA) is usable as a positioning method. The OTDOA method is a method of estimating a location of a UE through an intersection point of a hyperbola drawn by calculating a Reference Signal Timing Difference (RSTD) from Reference Signals (RSs) received from a multitude of BSs.

In some implementations of the present disclosure, a BS, a TP and a cell may be used together. So to speak, a BS/TP disclosed in the present specification may be interpreted as substituted with cell, and vice versa. Here, 'BS/TP' may mean 'BS and/or TP'.

Specifically, OTDOA will be described with reference to FIG. 15 as follows.

According to an OTDOA scheme, a UE calculates a timing difference between signals transmitted from various cells to the UE and then measure a location of the UE using the calculated timing difference. The UE may measure a delay time of a signal received from each cell and then report it to a serving cell or an anchor cell. In addition, having received the delay time from the UE, the serving or anchor cell may measure a location of the corresponding UE using the reported delay times.

In NR, to raise positioning accuracy of a UE, it is able to consider a scheme of using a wider BW to transmit a PRS. In addition, it is be able to consider a method of raising positioning accuracy in a manner of calculating an RSTD by receiving PRSs from more cells or performing a positioning using more complicated computation.

On the other hand, in the LTE system, a PRS may be generated as a PN sequence scrambled with a cell ID. Yet, if such sequences are received from a plurality of gNBs, correlation should be performed on the PRS sequences as many times as the number of the gNBs. If a PRS sequence is generated in the NR system in the manner of the LTE system, since it is highly probable that a small cell will be utilized in the NR system, computational complexity for correlating the respective PRS sequences may be increased considerably high.

Particularly, to raise the accuracy of positioning, a bandwidth wither than the existing may be allocated for a PRS. In such a case, in order for a UE to calculate RSTD for adjacent cells as many as possible, complexity of PRS correlation computation may be further increased.

Therefore, in the NR system, unlike the PRS in the LTE system, it may be necessary to introduce a PRS capable of lowering the complexity of correlation computation for the positioning of the NR system.

Accordingly, a scheme of designing a PRS capable of lowering complexity of correlation computation while supporting a positioning method of the NR system will be described in the present disclosure.

So to speak, in the present disclosure, it is intended to describe a PRS sequence designing method for lowering computational complexity of a positioning method to solve the complexity increase problem possibly caused in utilizing a PN sequence, which is generated by scrambling with a cell ID, for a PRS.

In a PRS sequence design according to an embodiment of the present disclosure, a location server such as an SMLC, an SLP and the like may configure/define/allocate N (N≥2) frequency domain cyclic-shifted versions of an orthogonal sequence as PRS sequences transmitted through the same time/frequency resources from N BSs/TPs to measure a location of a specific UE.

In this case, if N BSs/TPs simultaneously transmit PRSs and a UE performs cross correlation on the received PRSs, since a first peak of the PRSs transmitted from the N BSs/TPs appear in a time-delayed form, the UE may measure all TOA (Time of Arrival) of signals transmitted from the N BSs/TPs through a single cross correlation computation. Accuracy of the OTDOA based positioning may increase according to N. Namely, if the number of BSs/TPs that simultaneously transmit PRSs increases, the accuracy of the OTDOA based positioning may increase. However, in the above-described scheme, since the count of cross correlation computations fails to increase despite the increase of N, a performance gain obtainable in aspect of computational complexity may be considerable. So to speak, although the number of BSs/TPs simultaneously transmitting PRSs increases, since the computational count through cross correlation fails to increase, the computational complexity does not increase advantageously.

Meanwhile, if the same PRS ID is used for each BS/TP, since a UE is unable to measure and report an RSTD by identifying a BS/TP, a different PRS ID should be assigned for each BS/TP. Yet, if sequence initialization is performed according to a PRS ID, as an independent PRS sequence is generated for each BS/TP, it is difficult to apply a method of allocating N cyclic-shifted orthogonal sequences using a single PRS sequence to N BSs/TPs.

Therefore, according to an embodiment of the present disclosure, adjacent cells are classified into one or more cell groups, and sequence initialization is performed on PRS sequences transmitted through cells included in the same cell group based on the same cell group ID. In addition, within a cell group, an extent/level/figure of a cyclic shift is determined per PRS ID assigned to each cell included in a cell group and then configured/indicated for a UE.

So to speak, a UE receives configuration/indication of common information of a cell group and cell-independent information (or cell-specific information) on each cell included in the cell group from a location server.

For example, such information as a cell group ID for PRS sequence initialization, an expected RSTD value, an expected RSTD uncertainty and the like may be included as common information of a cell group, and such information as per-BS/TP cyclic shift information, an expected RSTD compensation value according to the per-BS/TP cyclic shift information, an expected RSTD uncertainty compensation value and the like may be included as cell-independent information (or cell-specific information). The expected RSTD value may mean an RSTD value expected by a location server using a rough location of a UE.

The UE may configure a PRS search window for receiving a PRS using the received expected RSTD value and the received expected RSTD uncertainty information. An expected RSTD uncertainty value may determine a size of the PRS search window, and the UE may detect a PRS by performing correlation on a PRS sequence in the corresponding PRS search window.

Meanwhile, an expected RSTD compensation value, an expected RSTD uncertainty compensation value and the like are transmitted in a manner of being included in cell-independent (or cell-specific) information on each BS/TP included in a cell group, whereby a location and size of a PRS search window for each BS/TP included in the cell group may be adjusted. In this case, common information of the cell group and cell-independent (or cell-specific) information on each BS/TP included in the cell group may be signaled to a target UE through LPP.

Referring to FIG. 19, a BS/TP may initialize the same PRS sequence for adjacent cells (or BS/TP) included in the same cell group using a cell group ID, generate a PRS sequence orthogonal per cell (or BS/TP) by applying a different cyclic shift value per cell (or BS/TP), and then transmit the PRS sequence to a UE. In this case, the PRS sequence may be generated based on Zadoff-Chu (ZC) sequence.

Meanwhile, a UE may generate a PRS sequence having the same initialization value as PRS sequences transmitted from a plurality of cells (or a plurality of BSs/TPs) based on cell group ID information received through a PLL protocol. In this case, a cyclic shift value applied to the PRS sequence generated by the UE may be the same as a reference cell, or an independent cyclic shift value indicated from a location server or a BS/TP may be applied for the PRS sequence generation.

A UE may configure a location and range of a PRS search window using an expected RSTD value, and expected RSTD uncertainty, an expected RSTD compensation value and an expected RSTD uncertainty compensation value received from a location server. And, the UE may perform correlation on the received PRSs within the PRS search window using a PRS sequence generated based on cell group ID information.

Here, the PRS sequence generated by the UE may have a single cyclic shift value applied thereto. On the other hand, PRS sequences transmitted from a plurality of BSs/TPs may have different cyclic shift values. Hence, if the UE performs correlation on the PRS sequences transmitted from a plurality of the BSs/TPs based on a single PRS sequence generated by the UE, a time delay occurs at a timing of detecting a peak for each of the PRS sequences.

Therefore, the UE may calculate an RSTD value to report to the location server actually based on the peak detection timing for each of the PRS sequences and per-BS/TP cyclic shift information included in the cell-independent (or cell-specific) information on the BSs/TPs included in the cell group indicated through the LPP. For example, by detecting a PRS at a location of an expected RSTD and reflecting a time delay attributed to a cyclic shift, it is able to compensate a timing of a peak occurrence.

Advantageously, the present embodiment only needs a single PRS sequence per cell group, whereas the LTE needs a PRS sequence per cell ID. Since correlation is performed on BSs/TPs included in a single cell group based on a single PRS sequence only, computational complexity may be decreased to be maximum [1/(number of BSs/TPs in cell group)] time smaller than the existing. Since such an embodiment of the present disclosure is applicable irrespective of how many BSs/TPs are included in a cell group, it can be used more usefully in an embodiment such as a small cell.

In addition, an embodiment of the present embodiment is applicable to all types of sequences having a property that a cyclic-shifted sequence is orthogonal in a frequency domain. In addition, a Cyclic Prefix (CP) and/or Guard Period (GP) of an appropriate length is applicable to maintain orthogonality of sequences.

Meanwhile, in an embodiment related to FIG. 16, N orthogonal sequences are generated by applying a cyclic shift to a PRS sequence.

Yet, a method of applying an actual time shift is considerable instead of a frequency domain cyclic shift. So to speak, when N BSs/TPs transmit PRSs actually, the PRS is transmitted in a manner of applying an actual time shift value configured for each BS/TP instead of a detection time delay occurring due to a cyclic shift. If a time shifted extent per BS/TP is indicated to a UE as an expected RSTD compensation value through an LPP protocol, the UE may configure a PRS search window per BS/TP using expected RSTD information and expected RSTD compensation value information. In such a case, the PRS search windows configured per BS/TP included in a cell group may be configured so as not to overlap each other. Although BSs/TPs included in the cell group use the same PRS sequence, the BS/TP having transmitted the received PRS sequence can be identified through the configured PRS search window.

Meanwhile, as described above, in order to measure an RSTD based on an actual time shift value, adjacent BSs/TPs or cells are grouped into a cell group and initialization of a PRS sequence may be performed based on a cell group ID of the cell group. In this case, a UE may receive common information of the cell group and cell-independent (or cell-specific) information on each of BSs/TPs included in the cell group from a location server. For example, the common information of the cell group may include information such as a cell group ID for PRS sequence initialization, an expected RSTD value, an expected RSTD uncertainty and the like. In addition, the cell-independent (or cell-specific) information may include per-BS/TP actual time shift information, a corresponding expected RSTD compensation value, an expected RSTD uncertainty compensation value and the like. In this case, the common information of the cell group and the cell-independent (or cell-specific) information on each BS/TP included in the cell group may be signaled to a target UE through LPP.

This is described in detail with reference to FIG. 20.

Figure 20:
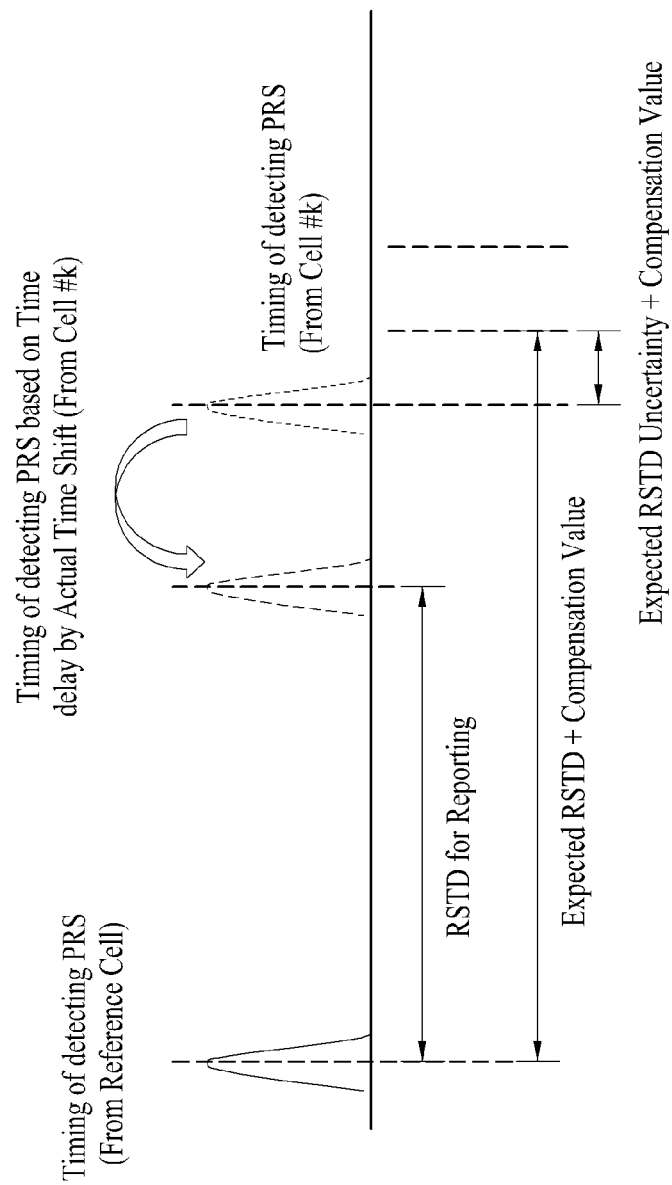

An embodiment of FIG. 20 may be applicable to a sequence failing to have an orthogonal property when a cyclic shift is applied. Hence, the embodiment of FIG. 17 is applicable to other sequences such as a PN sequence and a gold sequence as well as to sequence types applicable to the embodiment related to FIG. 19.

The embodiment of FIG. 20 is identical to that of FIG. 19 in generating a PRS sequence using a cell group ID. Yet, the embodiment of FIG. 20 differs from that of FIG. 19, in which a different cyclic shift is applied per BS/TP, in that a PRS sequence generated according to the embodiment of FIG. 20 is transmitted to a UE in a manner of applying an actual time shift different per BS/TP to generated PRS sequence.

So to speak, according to the embodiment of FIG. 20, a PRS sequence may be generated based on a cell group ID and then transmitted by delaying a time actually per BS/TP. A UE may configure a PRS search window for detecting a PRS based on a cell group common expected RSTD and an expected RSTD uncertainty value included in common information of a cell group received from a PLL protocol and an expected RSTD compensation value and an expected RSTD uncertainty compensation value included in cell-independent (or cell-specific) information for each BS/TP included in the cell group.

Meanwhile, if PRS search windows of a plurality of BSs/TPs are configured to overlap with each other, it is unable to identify which PRS sequence received in an overlapping area is transmitted from which BS/TP. Therefore, a location server configures a time shift extent per BS/TP, whereby PRS search windows for a plurality of BSs/TPs to enable a UE to search for a PRS can be prevented from overlapping with each other.

Although a PRS sequence is required for each cell ID in the LTE system, a single PRS sequence is necessary for each cell group according to the embodiment of FIG. 17. Therefore, according to the embodiment of FIG. 17, a UE may advantageously perform correlation based on a single PRS sequence only for a plurality of BSs/TPs included in a single cell group.

Therefore, since the embodiment of FIG. 20 is applicable irrespective of how many BSs/TPs are included in a cell group, it may be more useful to raise UE positioning accuracy by receiving many PRS sequences while reducing computational complexity in a such an environment as a small cell. On the other hand, in case of the embodiment of FIG. 20, like the embodiment of FIG. 19, at least one of a Cyclic Prefix (CP) of an appropriate length and a Guard Period (GP) of an appropriate length are applicable for a PRS sequence.

Meanwhile, unlike the embodiments of FIG. 19 and FIG. 20, there may be a method of generating a single PRS sequence common to each cell group and applying a cyclic shift by multiplying the generated PRS sequence by a Discrete Fourier Transform (DFT) per BS/TP. So to speak, each of the BSs/TPs may generate a PRS sequence with the same initialization value between adjacent BSs/TPs included in the same cell group based on cell group ID information and transmit it to a UE by multiplying the PRS sequence generated with the initialization value by an appropriate DFT sequence assigned per BS/TP.

In this case, the UE may generate a PRS sequence having the same initialization value of the PRS sequences transmitted from a plurality of the BSs/TPs using the cell group ID information received through the LPP protocol. In doing so, a DFT sequence applied to the PRS sequence generated by the UE may be the same as a reference cell or a separately received DFT sequence value may be applied. The UE may configure a location and range of a PRS search window based on an expected RSTD value, an expected RSTD uncertainty, an expected RSTD compensation value, an expected RSTD uncertainty compensation value, received from the location server.

The UE may perform correlation on PRSs received from a plurality of BSs/TPs using a single PRS sequence generated based on cell group ID information within the configured PRS search window. Since the PRS sequence generated by the UE is multiplied by a single DFT sequence only, if correlation is performed on the PRS sequences multiplied by different DFT sequences transmitted from a plurality of the BSs/TPs, a delay may occur in the timing of detecting a peak for the PRS sequences multiplied by the different DFT sequences.

Based on per-BS/TP sequence information included in cell-independent (or cell-specific) information for each of a plurality of BSs/TPs included in a cell group received through LPP, a UE may calculate an RSTD value to report actually. So to speak, the UE may detect a PRS sequence at an expected RSTD position and compensate a timing of peak occurrence based on a time delay due to DFT.

In case of the LTE system, a single PRS sequence is necessary per cell group. Yet, according to the above embodiment, a single PRS sequence is necessary per cell group including a plurality of cells. Namely, since correlation is performed on a single cell group based on a single PRS sequence only, computational complexity may be decreased to be maximum [1/(number of BSs/TPs in cell group)] time smaller than the case of the LTE system. So to speak, since such an embodiment of the present disclosure is applicable irrespective of the number of BSs/TPs included in a cell group, it can be more useful in raising positioning accuracy of a UE by receiving many PRS sequences while reducing the computational complexity in an embodiment such as a small cell.

Meanwhile, one OFDM symbol is additionally usable for PRS transmission. A PRS sequence commonly used by all BSs/TPs in a cell group may be mapped to the additionally used OFDM symbol and then transmitted to a UE. If the UE calculates correlation to PRS sequences of all the BSs/TPs within the cell group using the common PRS sequence, a peak for the PRSs transmitted by all the BSs/TPs is detected in a single Cyclic Prefix (CP). The UE may configure a portion from which the peak is detected as a symbol boundary and the perform correlation with the common PRS sequence in a symbol to which a PRS sequence multiplied by a different DFT sequence is mapped. In doing so, an RS TD may be detected using a relative position between the position configured as the symbol boundary and the peak point occurring by the correlation with the PRS sequence multiplied by the different DFT sequence. In this case, as PRS sequence detection may be performed in frequency domain, more accurate RSTD detection is available.

Meanwhile, the above-described embodiments can support both a narrow BandWidth (BW) and a wide BandWidth (BW). For example, a PRS sequence supportive of a narrow BW may be a portion of a PRS sequence supportive of a wide BW.

In addition, a wide BW may be generated in a manner that a PRS sequence supportive of a narrow BW is repeated. In addition, a location server may inform a UE of a presence or non-presence of synchronization between BSs/TPs, a mis-aligned extend of timing and the like, and the UE may use the information in case of PRS detection. For example, as inter-BS/TP is not matched, if an error of UE's positioning increases, it is able to perform a process for correcting it using phase information and the like.

FIGS. 21 to 24 are diagrams to describe implementation examples of a BS, a UE and a location server according to an embodiment of the present disclosure.

An implementation example of an operation of a network according to an embodiment of the present disclosure is described with reference to FIG. 21.

Figure 21:
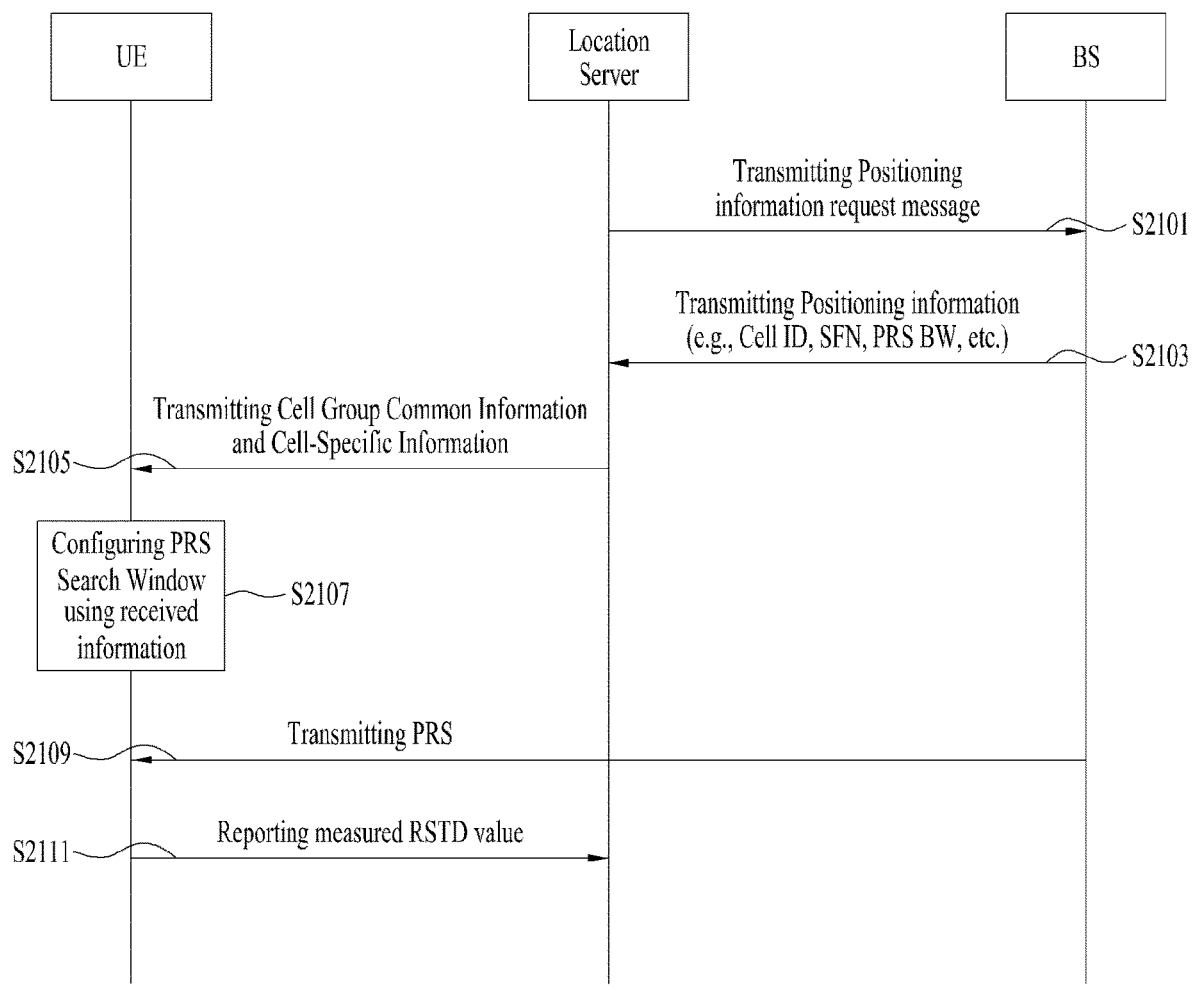
FIGS. 21 to 24 are diagram to describe operation implementation examples of a base station, a user equipment and a location server according to an embodiment of the present disclosure.

Referring to FIG. 21, a location server may send a positioning information request message, which requests to measure a location of a UE, to a BS [S2101]. Having received the positioning information request message, the BS may transmit positioning information such as a cell ID, an SFN for PRS transmission, bandwidth information for PRS transmission and the like to the location server [S2103]. In this case, information such as a cell group ID, cyclic shift information of each BS included in a cell group, actual time shift information, DFT sequence information and the like may be included in the positioning information.

The location server may transmit common information of a cell group and cell-independent (or cell-specific) information included in the cell group through a PLL protocol [S2105]. In this case, the common information of the cell group may include a cell group ID for PRS initialization, an expected RSTD value, an expected RSTD uncertainty and the like. And, the cell-independent (or cell-specific) information may include cyclic shift information per BS/TP included in the cell group, at least one of actual time shift information and DFT sequence information, a corresponding expected RSTD compensation value, a corresponding expected RSTD uncertainty compensation value and the like.

Meanwhile, the order of the steps disclosed in FIG. 21 is just exemplary and may be changed to execute the process. For example, the step S2105 may be performed prior to the execution of the steps S2101 to S2103, or the steps S2105 to S2107 may be executed ahead.

The UE may configure a PRS search window to detect a PRS using the information such as the expected RSTD value, the expected RSTD uncertainty, the per-BS/TP expected RSTD compensation value, the expected RSTD uncertainty compensation value and the like [S2017]. Thereafter, the BS may generate and transmit a PRS sequence to the UE [S2109], and the UE may detect a PRS by performing correlation on a PRS within the PRS search window configured per BS/TP based on the PRS sequence. In addition, the UE may measure an RSTD by reflecting cyclic shift information, actual time shift information, DFT sequence information and the like included in the cell-independent (or cell-specific) information received from the location server and then report the measured RSTD to the location server [S2111]. Then, the location server may estimate a location of the UE through OTDOA based on the reported RSTD values.

Meanwhile, an expected RSTD value is determined based on a PRS transmission time difference between two cells, a transmission time different of PRS positioning occasion, an expected propagation time difference and the like, and may include a positive or negative number.

An expected RSTD uncertainty is related to priori estimation of a location server for a UE location. It is able to configure a PRS search window based on an expected RSTD value and an expected RSTD uncertainty. In addition, in case that a PRS is transmitted, a UE may assume that a start of a PRS occasion group of a PRS configuration having the longest PRS occasion group periodicity of a neighbor cell is received within the PRS search window. If a PRS is not transmitted, the UE may assume that a start of a subframe nearest to a neighbor cell for a subframe x is received within the PRS search window.

Meanwhile, the specific operation of the network according to FIG. 21 may follow the above-described embodiments.

Figure 22:
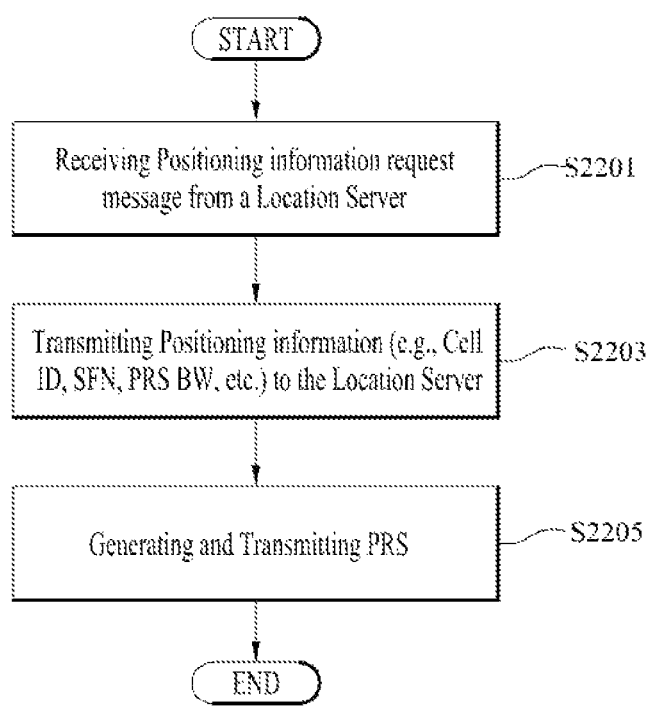

Looking into the implementation example of an operation of a UE according to an embodiment of the present disclosure through FIG. 22, the UE may receive common information of a cell group and cell-independent (or cell-specific) information on each BS/TP included in the cell group through a PLL protocol [S2201]. In this case, the common information of the cell group may include a cell group ID for PRS initialization, an expected RSTD value, an expected RSTD uncertainty and the like. And, the cell-independent (or cell-specific) information may include cyclic shift information per BS/TP included in the cell group, at least one of actual time shift information and DFT sequence information, a corresponding expected RSTD compensation value, a corresponding expected RSTD uncertainty compensation value and the like.

The UE may configure a PRS search window to detect a PRS using the information such as the expected RSTD value, the expected RSTD uncertainty, the per-BS/TP expected RSTD compensation value, the expected RSTD uncertainty compensation value and the like [S2203].

In addition, the UE may initialize a PRS based on the cell group ID information and generate a PRS sequence. And, the UE may detect a PRS by performing correlation on the PRS within the PRS search window configured per BS/TP based on the PRS sequence [S2205]. Thereafter, the UE may measure an RSTD by reflecting cyclic shift information, actual time shift information, DFT sequence information and the like included in the cell-independent (or cell-specific) information received from the location server and then report the measured RSTD to the location server [S2207]. Meanwhile, a specific method for measuring the RSTD by the UE may be based on the embodiments of the present disclosure described below.

Figure 23:
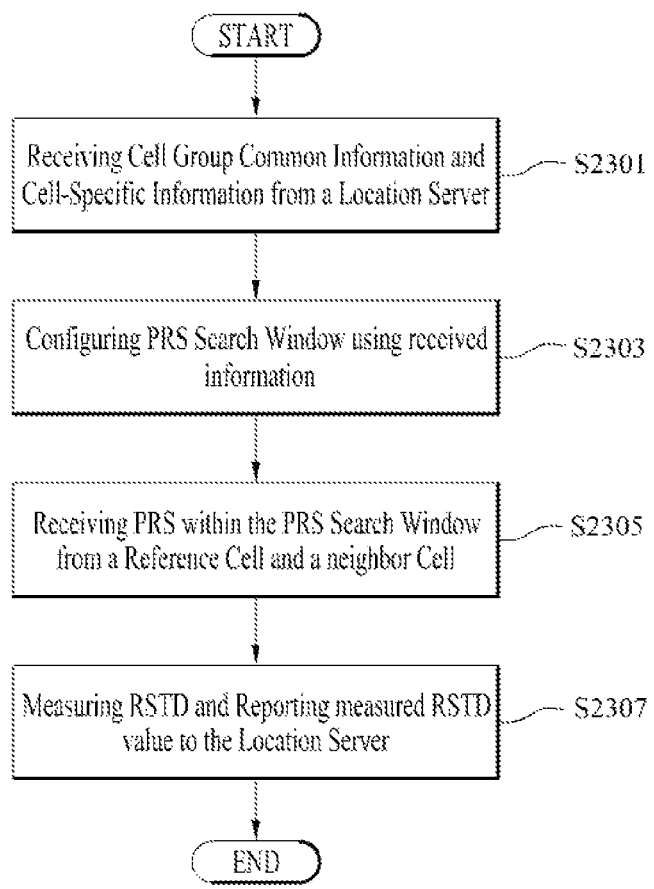

FIG. 23 shows an implementation example of an operation of a location server according to an embodiment of the present disclosure. Referring to FIG. 23, the location server may transmit common information of a cell group and cell-independent (or cell-specific) information included in the cell group through a PLL protocol [S2301]. In this case, the common information of the cell group may include a cell group ID for PRS initialization, an expected RSTD value, an expected RSTD uncertainty and the like. And, the cell-independent (or cell-specific) information may include cyclic shift information per BS/TP included in the cell group, at least one of actual time shift information and DFT sequence information, a corresponding expected RSTD compensation value, a corresponding expected RSTD uncertainty compensation value and the like.

The location server may send a positioning information request message, which requests to measure a location of a UE, to a BS [S2303]. And, the location server may receive positioning information such as a cell ID, an SFN for PRS transmission, a bandwidth information for PRS transmission and the like from the BS [S2305]. In this case, information such as a cell group ID, cyclic shift information of each BS included in a cell group, actual time shift information, DFT sequence information and the like may be included in the positioning information. Meanwhile, the order of the steps disclosed in FIG. 23 is just exemplary and may be changed to execute the process. For example, the step S2305 may be performed prior to the execution of the steps S2301 to S2303. The location server may receive the RSTD measured by the UE or estimate a location of the UE through OTDOA based on the received RSTD values [S2307].

Figure 24:
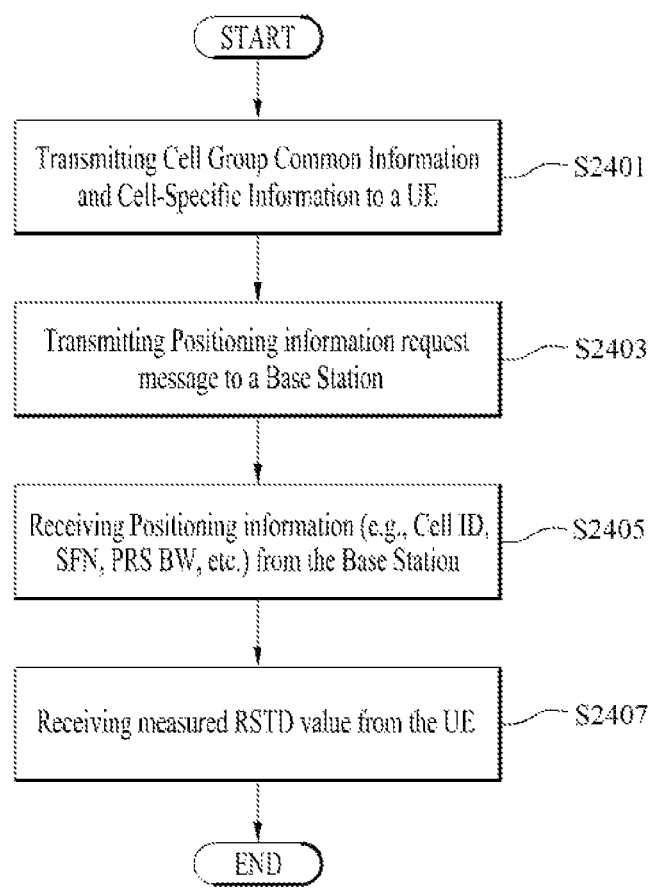

Looking into the implementation example of an operation of a BS according to an embodiment of the present disclosure through FIG. 24, a BS may receive a positioning information request message, which requests to measure a location of a UE, from a location server [S2401]. The BS may then transmit positioning information such as a cell ID, an SFN for PRS transmission, bandwidth information for PRS transmission and the like to the location server [S2403]. In this case, information such as a cell group ID, cyclic shift information of each BS included in a cell group, actual time shift information, DFT sequence information and the like may be included in the positioning information. Thereafter, the BS may generate and transmit a PRS sequence to the UE [S2405]. Meanwhile, a specific method of generating the PRS sequence by the UE may be based on embodiments of the present disclosure.

As described above, a specific embodiment of measuring an RSTD based on cell common information and cell-independent (or cell-specific) information received from the location server by the UE in the steps S2207 and S2109 to S2111 of measuring an RSTD by the UE and reporting the measured RSTD to the location server and a specific embodiment of generating a PRS sequence based on the cell common information and the cell-independent (or cell-specific) information in the steps S2405 and S2109 of transmitting a PRS by a BS may be performed based on the above-described embodiment.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

The embodiments of the present disclosure may be achieved by various means, for example, hardware, firmware, software, or a combination thereof. In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method of measuring a location of a UE in the above-described wireless communication system and apparatus therefor are described around an example applied to the 5G NewRAT system, they are applicable to various wireless communication systems as well as to the 5G NewRAT system.

What is claimed is:

1. A method of reporting a Reference Signal Timing Difference (RSTD) value by a user equipment (UE) in a wireless communication system, the method comprising:
transmitting a random access preamble related to a Synchronization Signal/Physical Broadcast Channel Block (SS/PBCH) block received from a specific cell included in a plurality of cells;
establishing an RRC connection to the specific cell by requesting a Radio Resource Control (RRC) connection based on a Random Access Response (RAR) received from the specific cell;
receiving, from a location server, a cell group identifier for a cell group including the plurality of the cells and cell-independent information for each of the plurality of cells;
generating a first Positioning Reference Signal (PRS) sequence based on the cell group identifier;
detecting second PRS sequences transmitted from the plurality of cells,
wherein the first PRS sequence and the second PRS sequences are based on a same sequence with different cyclic shift values; and
reporting, to the location server, Reference Signal Timing Difference (RSTD) information based on the first PRS sequence, the second PRS sequences and the cell-independent information.

2. The method of claim 1, wherein the cell-independent information includes cyclic shift values for each of the plurality of cells, actual time shift values for the plurality of cells each, or Discrete Fourier Transform (DFT) sequences for each of the plurality of cells.

3. The method of claim 1, wherein the first PRS sequence is obtained based on the cell group identifier and cell-independent information for a reference cell.

4. The method of claim 1, further comprising:
receiving, from the location server, expected RSTD information, expected RSTD uncertainty information, expected RSTD compensation information and expected RSTD uncertainty compensation information; and
obtaining at least one PRS search window for the plurality of cells based on the expected RSTD information, the expected RSTD uncertainty information, the expected RSTD compensation information and the expected RSTD uncertainty compensation information.

5. The method of claim 4, wherein the second PRS sequences are detected within the at least one PRS search window.

6. The method of claim 4, wherein the expected RSTD information and the expected RSTD uncertainty information are included in cell group common information and wherein the expected RSTD compensation information and the expected RSTD uncertainty compensation information are included in the cell-independent information.

7. The method of claim 4, wherein each of the at least one PRS search window is not overlapped with each other.

8. The method of claim 1, wherein the second PRS sequence related to a narrow bandwidth is configured as a part of the second PRS sequence related to a wide bandwidth.

9. The method of claim 1, wherein the second PRS sequence related to a wide bandwidth is configured in a manner that the second PRS sequence related to a narrow bandwidth is repeated.

10. The method of claim 1, wherein the UE communicates with at least one of another UE, a network, a base station or an autonomous vehicle.

11. An apparatus for reporting a Reference Signal Timing Difference (RSTD) value in a wireless communication system, the apparatus comprising:
at least one processor; and
at least one computer memory operably connectable to the at least one processor and storing instructions that, when executed by the at least one processor, perform operations comprising:
transmitting a random access preamble related to a Synchronization Signal/Physical Broadcast Channel Block (SS/PBCH) block received from a specific cell included in a plurality of cells;
establishing an RRC connection to the specific cell by requesting a Radio Resource Control (RRC) connection based on a Random Access Response (RAR) received from the specific cell;
receiving, from a location server, a cell group identifier for a cell group including the plurality of the cells and cell-independent information for each of the plurality of cells;
generating a first Positioning Reference Signal (PRS) sequence based on the cell group identifier;

detecting second PRS sequences transmitted from the plurality of cells, wherein the first PRS sequence and the second PRS sequences are based on a same sequence with different cyclic shift values; and reporting, to the location server, Reference Signal Timing Difference (RSTD) information based on the first PRS sequence, the second PRS sequences and the cell-independent information.

12. A user equipment (UE) configured to report a Reference Signal Timing Difference (RSTD) value in a wireless communication system, the UE comprising:

at least one transceiver;

at least one processor; and at least one computer memory operably connectable to the at least one processor and storing instructions that, when executed by the at least one processor, perform operations comprising:

transmitting, via the at least one transceiver, a random access preamble related to a Synchronization Signal/Physical Broadcast Channel Block (SS/PBCH) block received from a specific cell included in a plurality of cells;

establishing an RRC connection to the specific cell by requesting a Radio Resource Control (RRC) connection based on a Random Access Response (RAR) received from the specific cell;

receiving, via the at least one transceiver from a location server, a cell group identifier for a cell group including the plurality of the cells and cell-independent information for each of the plurality of cells;

generating a first Positioning Reference Signal (PRS) sequence based on the cell group identifier;

detecting second PRS sequences transmitted from the plurality of cells, wherein the first PRS sequence and the second PRS sequences are based on a same sequence with different cyclic shift values; and reporting, to the location server, Reference Signal Timing Difference (RSTD) information based on the first PRS sequence, the second PRS sequences and the cell-independent information.

13. A method of receiving a Reference Signal Timing Difference (RSTD) value by a base station (BS) in a wireless communication system, the method comprising:

transmitting a Synchronization Signal/Physical Broadcast Channel Block (SS/PBCH) block on a cell;

receiving a random access preamble related to the SS/PBCH block;

transmitting a Random Access Response (RAR) in response to the random access preamble;

performing a Radio Resource Control (RRC) connection to a user equipment (UE) based on the RAR;

generating a second PRS sequence for the cell based on a cell group identifier for a cell group including the cell;

transmitting, to the UE, the second PRS sequence on the cell; and receiving, from the UE, the RSTD information, wherein the RSTD information is based on a first PRS sequence, the second PRS sequence and the cell-independent information, and wherein the first PRS sequence and the second PRS sequences are based on a same sequence with different cyclic shift values.

14. A base station (BS) configured to receive a Reference Signal Timing Difference (RSTD) value in a wireless communication system, the BS comprising:

at least one transceiver;

at least one processor; and at least one computer memory operably connectable to the at least one processor and storing instructions that, when executed by the at least one processor, perform operations comprising:

transmitting a Synchronization Signal/Physical Broadcast Channel Block (SS/PBCH) block transmitted on a cell;

receiving a random access preamble related to the SS/PBCH block;

transmitting, via the at least one transceiver, a Random Access Response (RAR) in response to the random access preamble;

performing a Radio Resource Control (RRC) connection to a user equipment (UE) based on the RAR;

generating a second PRS sequence for the cell based on a cell group identifier for a cell group including the cell;

transmitting, via the at least one transceiver to the UE, the second PRS sequence on the cell; and receiving, from the UE, the RSTD information, wherein the RSTD information is based on a first PRS sequence, the second PRS sequence and the cell-independent information, and wherein the first PRS sequence and the second PRS sequences are based on a same sequence with different cyclic shift values.

* * * * *